United States Patent
Morita et al.

(10) Patent No.: US 9,543,600 B2
(45) Date of Patent: Jan. 10, 2017

(54) FUEL CELL SYSTEM

(71) Applicant: HONDA MOTOR CO., LTD., Tokyo (JP)

(72) Inventors: Shinjiro Morita, Saitama (JP); Koichiro Miyata, Saitama (JP); Yusai Yoshimura, Saitama (JP); Osamu Ohgami, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 260 days.

(21) Appl. No.: 14/083,501

(22) Filed: Nov. 19, 2013

(65) Prior Publication Data

US 2014/0141345 A1    May 22, 2014

(30) Foreign Application Priority Data

Nov. 21, 2012 (JP) ................. 2012-254903

(51) Int. Cl.
*H01M 8/06* (2016.01)
*H01M 8/04* (2016.01)

(52) U.S. Cl.
CPC .......... *H01M 8/04097* (2013.01); *H01M 8/04* (2013.01); *H01M 8/04201* (2013.01); *Y02E 60/50* (2013.01)

(58) Field of Classification Search
CPC  H01M 8/04; H01M 8/04097; H01M 8/04201; Y02E 60/50
USPC .......................................... 429/415
See application file for complete search history.

(56) References Cited

U.S. PATENT DOCUMENTS

| 2007/0248858 A1* | 10/2007 | Blaszczyk ......... H01M 8/04089 429/415 |
| 2009/0081495 A1* | 3/2009 | Willimowski .... H01M 8/04089 429/404 |
| 2009/0155641 A1 | 6/2009 | Senner et al. |
| 2013/0164641 A1* | 6/2013 | Fukuda ............. H01M 8/04097 429/415 |

FOREIGN PATENT DOCUMENTS

| JP | 2010-267551 A | 11/2010 |
| JP | 2011-179333 A | 9/2011 |
| JP | 2012-119300 A | 6/2012 |

OTHER PUBLICATIONS

German Search Report application No. 10 2013 223 470.8 dated Aug. 11, 2014.
Japanese Office Action corresponding to Japanese Patent Application No. 2013-214951, dated Sep. 13, 2016.

* cited by examiner

*Primary Examiner* — Jonathan Jelsma
*Assistant Examiner* — Omar Kekia
(74) *Attorney, Agent, or Firm* — Squire Patton Boggs (US) LLP

(57) ABSTRACT

A fuel cell system that can supply fuel gas appropriately is provided. The fuel cell system includes an injector 23A and an injector 23B which inject fuel gas, and an ECU 50. The ECU 50 adjusts the flow rate of the fuel gas that is injected from the injector 23A by adjusting the valve opening time period and the valve closing time period of the injector 23A, which are repeated alternately, and make at least a part of the valve opening time period of the injector 23B overlap with the valve closing time period of the injector 23A when opening the valve of the injector 23B.

15 Claims, 18 Drawing Sheets

⟨ HIGH POWER TIME CONTROL:INJ A ⟩

⟨ HIGH POWER TIME CONTROL:INJ B ⟩

FUEL CELL SYSTEM

FIELD OF THE INVENTION

The present invention relates to a fuel cell system including fuel gas injection devices, such as injectors.

BACKGROUND ART

In recent years, fuel cell systems, which generate electricity by supplying hydrogen (fuel gas) and air containing oxygen (oxidant gas), have been developed and are expected as power sources for fuel cell vehicles, for example. The flow rate and pressure of hydrogen supplied to the fuel cell in a fuel cell system are adjusted using, for example, regulators and injectors. Especially, when injectors are used, for example, the injection timing and injection time period of hydrogen can be finely controlled by opening and closing valve bodies with electromagnetic driving force that is applied in pulse form at an interval of a predetermined time period (interval).

For example, Patent Document 1 describes a fuel control device in which a plurality of injectors are provided in series or in parallel in hydrogen supply routes where hydrogen is supplied from a hydrogen supply unit to the fuel cell. In addition, Patent Document 1 describes to control opening and closing of the injectors such that the injectors are opened and closed at intervals of the same cycle period and the same timing.

In addition, Patent Document 2 describes respectively arranging a main supply injector and an auxiliary supply injector upstream of the ejector, and the main supply injector and the auxiliary supply injector injecting hydrogen substantially alternately with temporal phase difference.

Patent Document 1: Japan Patent Application Laid Open No. 2012-119300

Patent Document 2: Japan Patent Application Laid Open No. 2011-179333

The valve opening time period of the valve body included in the injector is controlled according to the time period electrified onto a solenoid, which is a source of generating the above-described electromagnetic driving force. It should be noted that, if we assume that ON duty is 100% during a drive interval of the injector (i.e., if the injector is continuously electrified), there is a possibility that the device suffers from fixation by being heated. Therefore, it is necessary to set a predetermined OFF time period during the interval even when driving the injectors with maximum ON duty. Meanwhile, hydrogen is consumed continuously in fuel cells. Accordingly, in the technique described in Patent Document 1, there is a possibility that hydrogen of an amount corresponding to a hydrogen requirement amount of the fuel cell cannot be supplied appropriately as a result of setting the above-described OFF time period.

In addition, when the hydrogen requirement amount is small at the starting time of the interval, the above-described ON duty of the plurality of injectors is, of course, set to a small value, and the hydrogen supply amount during the current interval is small also. Here, in the technique described in Patent Document 1, when the hydrogen requirement amount has increased rapidly before the starting time of the next interval, there may be deficiencies in stoichiometry since hydrogen cannot be supplied immediately according to such change in the hydrogen requirement amount.

In addition, in the technique described in Patent Document 2, the main supply injector and the auxiliary supply injector are arranged upstream of the ejector. Therefore, since there are pressure losses in the ejectors upon injecting hydrogen from each injector, hydrogen of sufficient flow rate may not be able to be supplied to the fuel cell.

SUMMARY OF THE INVENTION

An object of the present invention is to provide a fuel cell system that can supply fuel gas appropriately.

In order to achieve the above-described object, a fuel cell system according to the present invention includes: a fuel cell which generates electricity by fuel gas being supplied to a fuel gas fluidic channel and oxidant gas being supplied to an oxidant gas fluidic channel; a first fuel gas supply fluidic channel through which fuel gas directed to the fuel gas fluidic channel flows; a fuel off gas discharge fluidic channel through which fuel off gas discharged from the fuel gas fluidic channel flows; a return fluidic channel through which fuel off gas returning from the fuel off gas discharge fluidic channel to the first fuel gas supply fluidic channel flows; a first fuel gas injection device which is provided in the first fuel gas supply fluidic channel and injects fuel gas by opening and closing a valve; an ejector which is provided in the first fuel gas supply fluidic channel downstream of the first fuel gas injection device and mixes fuel off gas returning from the fuel off gas discharge fluidic channel to the first fuel gas supply fluidic channel via the return fluidic channel with fuel gas to be injected by the first fuel gas injection device; a second fuel gas supply fluidic channel through which fuel gas directed to the fuel gas fluidic channel flows and a downstream end of the second fuel gas supply fluidic channel is connected to the first fuel gas supply fluidic channel downstream of the ejector; a second fuel gas injection device which is provided in the second fuel gas supply fluidic channel and injects fuel gas by opening and closing a valve; and a control means for controlling the first fuel gas injection device and the second fuel gas injection device, wherein the control means adjusts a flow rate of the fuel gas injected from the first fuel gas injection device by adjusting a valve opening time period and a valve closing time period of the first fuel gas injection device, which are repeated alternately, and makes at least a part of the valve opening time period of the second fuel gas injection device overlap with the valve closing time period of the first fuel gas injection device when opening the valve of the second fuel gas injection device.

According to such a structure, the fuel gas to be injected by the second fuel gas injection device is supplied to the fuel gas fluidic channel via the second fuel gas supply fluidic channel (i.e., without passing through the ejector where the pressure loss is large). Therefore, it is possible to avoid deficiencies in stoichiometry by making the fuel gas to be injected from the second fuel gas injection device mix with the fuel gas and fuel off gas that are directed to the fuel gas fluidic channel via the ejector.

In addition, the control means makes at least a part of the valve opening time period of the second fuel gas injection device overlap with the valve closing time period of the first fuel gas injection device when opening the valve of the second fuel gas injection device. That is, the control means makes the valve of the second fuel gas injection device open in at least a part of the valve closing time period of the first fuel gas injection device out of the valve opening time period and the valve closing time period of the first fuel gas injection device, which are repeated alternately. Therefore, the fuel gas supplied to the fuel cell can be brought close to a continuous flow and it is possible to deal with continuous consumption of fuel gas.

In addition, in the above-described fuel cell system, it is preferable if the control means makes a continuous time period in which valves of both the first fuel gas injection device and the second fuel gas injection device are closed not become greater than or equal to a predetermined time period when opening the valve of the second fuel gas injection device.

According to such a structure, it is possible to suppress a continuous time period when the fuel gas is not supplied to the fuel cell less than or equal to a predetermined time period. That is, deficiencies in stoichiometry can be avoided by bringing the fuel gas that is injected from the first fuel gas injection device and the second fuel gas injection device and joins in the first fuel gas supply fluidic channel close to a continuous flow.

In addition, in the above-described fuel cell system, it is preferable if the control means makes the valve opening time period of the second fuel gas injection device include time near a center of the valve closing time period of the first fuel gas injection device when opening the valve of the second fuel gas injection device.

According to such a structure, the control means makes the valve opening time period of the second fuel gas injection device include time near the center of the valve closing time period of the first fuel gas injection device. Therefore, it is possible to shorten the time period when the fuel gas is not continuously supplied to the fuel cell and avoid deficiencies in stoichiometry.

In addition, in the above-described fuel cell system, it is preferable if the control means comprises: an interval setting means for setting a first interval which consists of an opening time period and a closing time period of the first fuel gas injection device and a second interval which consists of an opening time period and a closing time period of the second fuel gas injection device; a first valve opening time period calculation means for calculating the valve opening time period of the first fuel gas injection device during the first interval; a second valve opening time period calculation means for calculating the valve opening time period of the second fuel gas injection device during the second interval; and an injection starting time setting means for setting injection starting time of the second fuel gas injection device such that the second fuel gas injection device is in a valve open state during at least a valve closing time period of the first fuel gas injection device when high power is required at a time of starting valve opening of the first fuel gas injection device.

According to such a structure, the injection starting time setting means sets the injection starting time of the second fuel gas injection device such that the second fuel gas injection device is in a valve opening state during at least the valve closing time period of the first fuel gas injection device when high power is required at the time of starting valve opening of the first fuel gas injection device. Therefore, it is possible to deal with the high power requirement appropriately by making the fuel gas supplied to the fuel cell a continuous flow.

In addition, in the above-described fuel cell system, it is preferable if the control means further comprises a fuel gas requirement amount calculation means for calculating a fuel gas requirement amount required for generating electricity in the fuel cell; the interval setting means sets the first interval and the second interval according to the fuel gas requirement amount calculated by the fuel gas requirement amount calculation means; the first valve opening time period calculation means calculates a valve opening time period of the first fuel gas injection device during the first interval according to the fuel gas requirement amount calculated by the fuel gas requirement amount calculation means; and the second valve opening time period calculation means calculates a valve opening time period of the second fuel gas injection device during the second interval according to the fuel gas requirement amount calculated by the fuel gas requirement amount calculation means.

According to such a structure, the interval (first interval) and the valve opening time period of the first fuel gas injection device are calculated and the interval (second interval) and the valve opening time period of the second fuel gas injection device are calculated according to the fuel gas requirement amount. Therefore, it is possible to supply fuel gas of an amount according to the fuel gas requirement amount to the fuel cell neither too much nor too little than required.

In addition, in the above-described fuel cell system, it is preferable if the injection starting time setting means sets injection starting time of the second fuel gas injection device such that valve open ending time of the second fuel gas injection device matches with ending time of the first interval according to the fuel gas requirement amount calculated by the fuel gas requirement amount calculation means.

According to such a structure, the injection starting time setting means makes the valve opening ending time of the second fuel gas injection device match with the ending time of the first interval according to the fuel gas requirement amount calculated by the fuel gas requirement amount calculation means. Therefore, even when the fuel gas requirement amount has increased rapidly after ending the valve opening of the first fuel gas injection device, it is possible to assist the supply of fuel gas with the second fuel gas injection device and avoid deficiencies in stoichiometry.

In addition, in the above-described fuel cell system, it is preferable if the interval setting means sets a valve closing time period of the first fuel gas injection device during the first interval as the second interval according to the fuel gas requirement amount calculated by the fuel gas requirement amount calculation means; and the second valve opening time period calculation means calculates a valve opening time period of the second fuel gas injection device during the second interval at a time of ending valve opening of the first fuel gas injection device.

According to such a structure, the second valve opening time period calculation means calculates the valve opening time period of the second fuel gas injection device during the second interval at the time of ending the valve opening of the first fuel gas injection device. That is, the fuel gas is supplied alternately in time by the first fuel gas injection device and the second fuel gas injection device. Therefore, even when high power is required after the start of the valve opening of the first fuel gas injection device, it is possible to deal with the situation immediately.

In addition, in the above-described fuel cell system, the second valve opening time period calculation means sets a valve opening time period of the second fuel gas injection device during the second interval to zero according to the fuel gas requirement amount calculated by the fuel gas requirement amount calculation means.

According to such a structure, the second valve opening time period calculation means sets the valve opening time period of the second fuel gas injection device to zero according to the fuel gas requirement amount. Therefore, it is possible to avoid supplying the fuel gas needlessly (in excess) to the fuel cell.

In addition, the above-described injection starting time setting means, it is preferable if the injection starting time setting means sets injection starting time of the second fuel gas injection device according to the fuel gas requirement amount at a time of ending valve opening of the first fuel gas injection device.

According to such a structure, the injection starting time setting means sets the injection starting time of the second fuel gas injection device according to the fuel gas requirement amount at the time of ending the valve opening of the first fuel gas injection device. Therefore, the injection timing of the second fuel gas injection device during the second interval can be set correctly and flexibly according to the fuel gas requirement amount.

In addition, in the above-described fuel cell system, it is preferable if the interval setting means sets the second interval to a same time period section as the first interval.

According to such a structure, the interval setting means sets the second interval to the same time period section as the first interval. Thereby, the valve opening starting time of the second fuel gas injection device can be set to any time during the interval of the first fuel gas injection device (first interval). Therefore, it is possible to supply fuel gas of the flow rate corresponding to the target value of fuel gas supply amount.

In addition, in the above-described fuel cell system, it is preferable if the injection starting time setting means sets the injection starting time of the second fuel gas injection device such that a valve closing continuation time period of the second fuel gas injection device during the second interval does not become greater than or equal to a predetermined time period.

According to such a structure, it is possible to suppress the time period when the fuel gas is not supplied to the fuel cell less than or equal to a predetermined time period. That is, it is possible to avoid deficiencies in stoichiometry by bringing the fuel gas injected from the first fuel gas injection device and the second fuel gas injection device close to a continuous flow.

In addition, in the above-described fuel cell system, it is preferable if the fuel gas requirement amount calculation means calculates the fuel gas requirement amount according to an accelerator level of a fuel cell vehicle that has the fuel cell system therein.

According to such a structure, the fuel gas requirement amount calculation means calculates the fuel gas requirement amount corresponding to the accelerator level of the fuel cell vehicle. Therefore, it is possible to supply the fuel gas of the amount corresponding to the fuel gas requirement amount to the fuel cell neither too much nor too little.

According to the present invention, it is possible to provide a fuel cell system that can supply fuel gas appropriately.

BRIEF DESCRIPTION OF THE DRAWINGS

FIG. 15A is a time chart showing temporal changes in anode hydrogen concentration;

FIG. 15B is a time chart showing temporal changes in ON/OFF of the injector A;

FIG. 15C is a time chart showing temporal changes in ON/OFF of the injector B;

FIG. 18A is a time chart showing temporal changes in anode pressure;

FIG. 18B is a time chart showing temporal changes in current values;

FIG. 18C is a time chart showing temporal changes in ON/OFF of the injector A;

FIG. 18D is a time chart showing temporal changes in ON/OFF of the injector B.

DETAILED DESCRIPTION OF THE INVENTION

Embodiments of the present invention will be described in detail with reference to the drawings as appropriate.

Although cases where fuel cell systems S1 and S2 are applied to a fuel cell vehicle will be described as an example below, the present invention is not limited to applications of fuel cell vehicles. For example, the fuel cell systems S1 and S2 may be used for movable objects, such as marine vessels and airplanes, and may be used for stationary type systems.

<<First Embodiment>>

<Structure of the Fuel Cell System>

Figure 1:
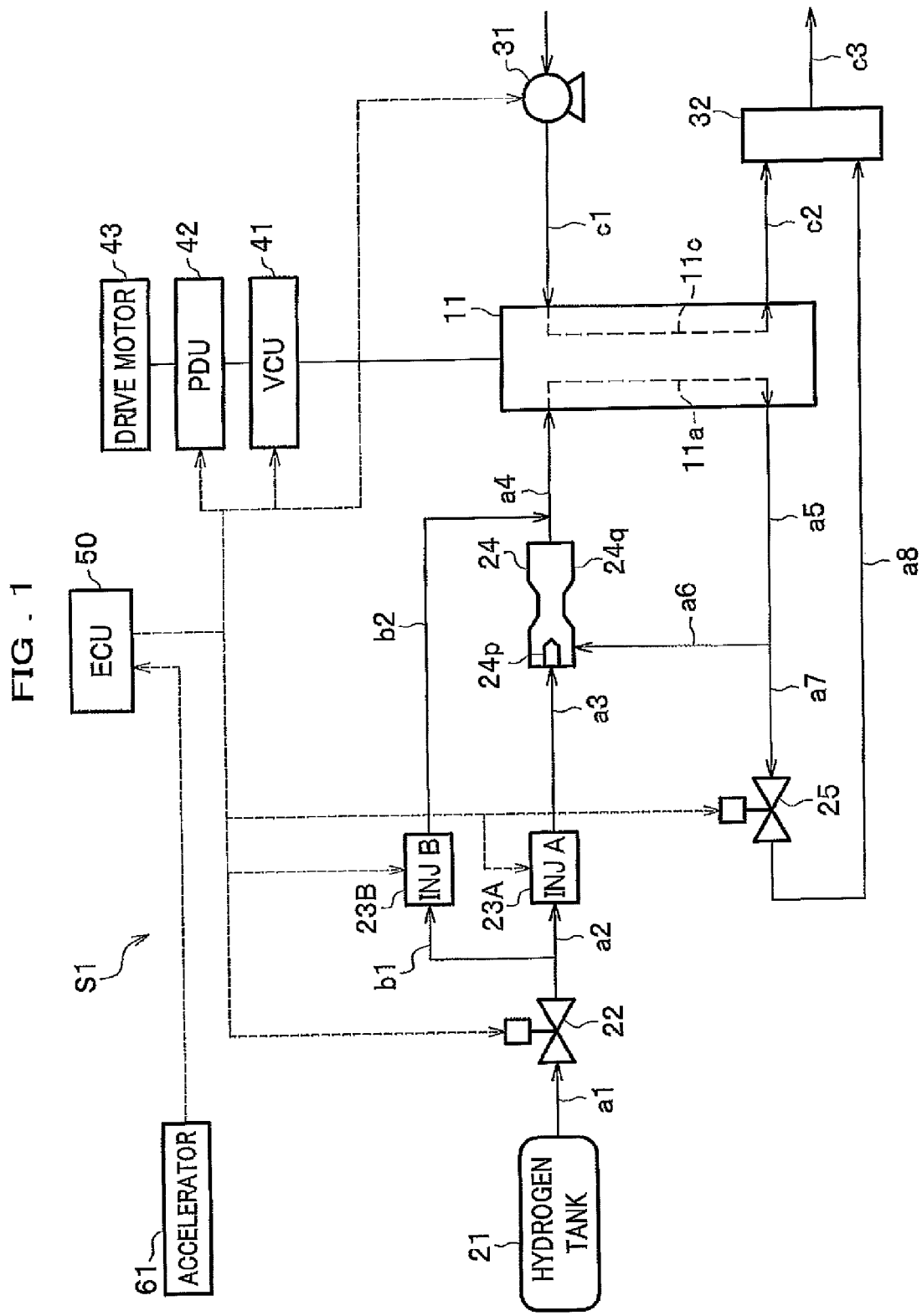
FIG. 1 is an overall structural view of a fuel cell system according to a first embodiment of the present invention.

FIG. 1 is an overall structural view of the fuel cell system according to the first embodiment of the present invention. The fuel cell system S1 includes: a fuel cell 11; an anode system which supplies hydrogen (fuel gas) to an anode of the fuel cell 11; a cathode system which supplies air (oxidant gas) containing oxygen to a cathode of the fuel cell 11; a power consumption system which consumes the generated power of the fuel cell 11; and an ECU 50 (control means) which controls the above units.

<Fuel Cell>

The fuel cell 11 is a polymer electrolyte fuel cell (PEFC) and is configured by laminating a plurality of single cells (not illustrated) in which a pair of electrically-conductive separators (not illustrated) sandwich and hold a membrane electrode assembly (MEA) (not illustrated). Grooves and through holes are formed in each separator of the fuel cell 11 for supplying hydrogen or oxygen onto overall surface of the membrane electrode assembly. Such grooves and through holes function as an anode fluidic channel 11a (fuel gas fluidic channel) and a cathode fluidic channel 11c (oxidant gas fluidic channel). It should be noted that a refrigerant fluidic channel (not illustrated) which makes coolant for cooling the fuel cell 11 flow through is formed in each separator.

When hydrogen is supplied to the anode fluidic channel 11a and air containing oxygen is supplied to the cathode fluidic channel 11c, a predetermined electrode reaction is carried out in the fuel cell 11, and there is produced an electrical potential difference (OCV: Open Circuit Voltage) in each single cell. Subsequently, when electrical current is taken out by the fuel cell and the drive motor 43 being electrically connected, the electrode reaction in the fuel cell 11 progresses.

<Anode System>

The anode system includes: a hydrogen tank 21, a cutoff valve 22, an injector 23A (first fuel gas injection device), an injector 23B (second fuel gas injection device), an ejector 24, and a purge valve 25. The hydrogen tank 21 is connected to the cutoff valve 22 via piping a1 and filled with high purity hydrogen with compression of high pressure. The cutoff valve 22 is a normally-closed type electromagnetic valve connected to the injector 23A via the piping a2, and is opened and closed according to instructions from the ECU 50.

The injector 23A (first fuel gas injection device) is a device that injects fuel gas by carrying out opening and closing according to instructions from the ECU 50. The upstream side of the injector 23A is connected to the cutoff valve 22 via the piping a2 and the downstream side is connected to the ejector 24 via the piping a3. It should be noted that, in the drawings, the injector 23A is denoted as "INJ A" or "INJECTOR A".

When the cutoff valve 22 is opened according to the instructions from the ECU 50 and the injector 23A is opened, hydrogen in the hydrogen tank 21 is supplied to the anode fluidic channel 11a through the first fuel gas supply fluidic channel. Here, "the first fuel gas supply fluidic channel" is configured to include piping a1, a2, a3 and a4, and its one end is connected to the hydrogen tank 21 and the other end is connected to the inlet of the anode fluidic channel 11a.

For example, the injector 23A includes: a valve body (not illustrated) which contacts onto and detaches from a valve seat (not illustrated); and a solenoid (not illustrated) which serves as a driving source of the valve body. When pulse form voltage is impressed according to the instructions from the ECU 50, magnetizing current flows into the solenoid and the injector 23A opens and closes at intervals of a predetermined interval. Note that the above-described "interval" means a time period needed for one cycle upon opening and closing the injector 23A (i.e., an opening time period and a closing time period of the injector 23A). This is the same with the injector 23B, which will be described later.

The injector 23B (second fuel gas injection device) is a device that injects fuel gas by opening and closing according to instructions from the ECU 50. The upstream side of the injector 23B is connected to the piping a2 via the piping b1 and the downstream side is connected to the piping a4 via the piping b2. It should be noted that, in the drawings, the injector 23B is denoted as "INJ B" or "INJECTOR B".

Since the structure of the injector 23B in the present embodiment is the same as that of the injector 23A, the description will be omitted. When the cutoff valve 22 is opened according to the instructions from the ECU 50 and the injector 23B is opened, hydrogen in the hydrogen tank 21 is supplied to the anode fluidic channel 11a through the second fuel gas supply fluidic channel and the piping a4. Here, "the second fuel gas supply fluidic channel" is configured to include piping a1, a2, b1 and b2. Its one end is connected to the hydrogen tank 21 and the other end is connected to the first fuel gas supply fluidic channel (piping a4). That is, the second fuel gas supply fluidic channel is connected to the first fuel gas supply fluidic channel such that hydrogen directed to the anode fluidic channel 11a joins with the fuel gas that flows through the first fuel gas supply fluidic channel.

Electric power is supplied from the fuel cell 11 or a battery (not illustrated) to the injectors 23A and 23B. In addition, the size relation between the bore diameter of the nozzle (not illustrated) included in the injector 23A and the bore diameter of the nozzle (not illustrated) included in the injector 23B can be set as appropriate.

The ejector 24 is connected to the inlet of the anode fluidic channel 11a via the piping a4 and negative pressure is generated in surroundings of the nozzle 24p as a result of injecting from the nozzle 24p hydrogen supplied from hydrogen tank 21. The fuel off gas (including non-reacted hydrogen) discharged from an outlet of the anode fluidic channel 11a is supplied to the anode fluidic channel 11a via the piping a4 after being drawn in via the piping a5 and a6 with the above-described negative pressure and being mixed with hydrogen in the diffuser 24q.

The purge valve 25 has a function for discharging impurities (e.g., water vapor and nitrogen) accumulated in the circulation fluidic channel including the piping a4, the anode fluidic channel 11a, the piping a5 and a6 out to a diluter 32 through the fuel off gas discharge fluidic channel by opening the valve intermittently according to the instructions from the ECU 50. Here, "fuel off gas discharge fluidic channel" is configured to include piping a5, a7 and a8. In addition, "return fluidic channel" through which the fuel off gas that returns from the above-described fuel off gas discharge fluidic channel to the first fuel gas supply fluidic channel flows is configured to include piping a6.

It should be noted that the downstream end of the piping b2 (second fuel gas supply fluidic channel) shown in FIG. 1 is connected to the piping a4 (first fuel gas supply fluidic channel) downstream of the ejector 24. The off gas that is discharged from the anode fluidic channel 11a and returns to the piping a4 (first fuel gas supply fluidic channel) via the piping a5 (fuel off gas discharge fluidic channel) and the piping a6 (return fluidic channel), and hydrogen injected by the injector 23A are mixed with each other in the ejector 24 arranged downstream of the injector 23A and are supplied to the fuel gas fluidic channel 11a via the piping a4.

<Cathode System>

The cathode system includes a compressor 31 and a diluter 32. By rotating an internal impeller (not illustrated) according to the instructions from the ECU 50, the compressor 31 draws in and compresses air (oxidant gas) from the outside of the vehicle and supplies the air to the cathode fluidic channel 11c of the fuel cell 11 through the oxidant gas supply fluidic channel. It should be noted that "oxidant gas supply fluidic channel" is configured to include the piping c1.

The diluter 32 dilutes fuel off gas, which flows in via the piping a7 upon the valve opening of the purge valve 25, with oxidant off gas, which flows in via the piping c2, and discharges the fuel off gas to outside of the vehicle via the piping c3. In addition, there are provided with: a humidifier (not illustrated) for carrying out water exchange between low humidity air supplied from the compressor 31 and high humidity oxidant off gas discharged from the cathode fluidic channel 11c; and a backpressure valve (not illustrated) provided between the humidifier and the diluter 32 for controlling pressure in the cathode fluidic channel 11c.

<Power Consumption System>

The power consumption system includes a VCU 41, a PDU 42, and the drive motor 43. The VCU 41 (Voltage Control Unit) controls the generated electric power of the fuel cell 11 and charge and discharge of a battery (not illustrated), and includes therein electronic circuits, such as a DC/DC chopper (not illustrated) and a DC/DC converter (not illustrated). The PDU 42 (Power Drive Unit) is configured by, for example, an inverter circuit (not illustrated), and converts into three phase alternating current electric power the DC power supplied from the fuel cell 11 or the battery (not illustrated) and supplies the DC power to the load, which includes the drive motor 43. The drive motor 43 is, for example, a three phase alternating current motor of a permanent magnet synchronous type and rotary drives the driving wheel of the fuel cell vehicle with three phase AC power converted by the PDU 42.

<Control System>

The ECU 50 (control means: Electric Control Unit) is configured to include a CPU (Central Processing Unit), a ROM (Read Only Memory), a RAM (Random Access Memory), and electric circuits such as various kinds of interfaces, and executes various kinds of functions according to programs stored inside. The ECU 50 includes a function for carrying out PWM (Pulse Width Modulation) control of the injectors 23A and 23B. That is, the ECU 50 has a function for controlling hydrogen injection amount of the injectors 23A and 23B by making variable the ratio of open instructions, which are output to the injectors 23A and 23B, to the interval (valve opening time [Ti value]; ON duty).

<Other Apparatus>

The accelerator 61 is a pedal stepped on by the driver when driving the fuel cell vehicle including the fuel cell 11, and is arranged near the foot position of the driver's seat. In addition, the accelerator 61 outputs to the ECU 50 accelerator level information indicating the accelerator level (i.e., stepping down amount) of the accelerator 61.

<Structure of the ECU 50>

Figure 2:
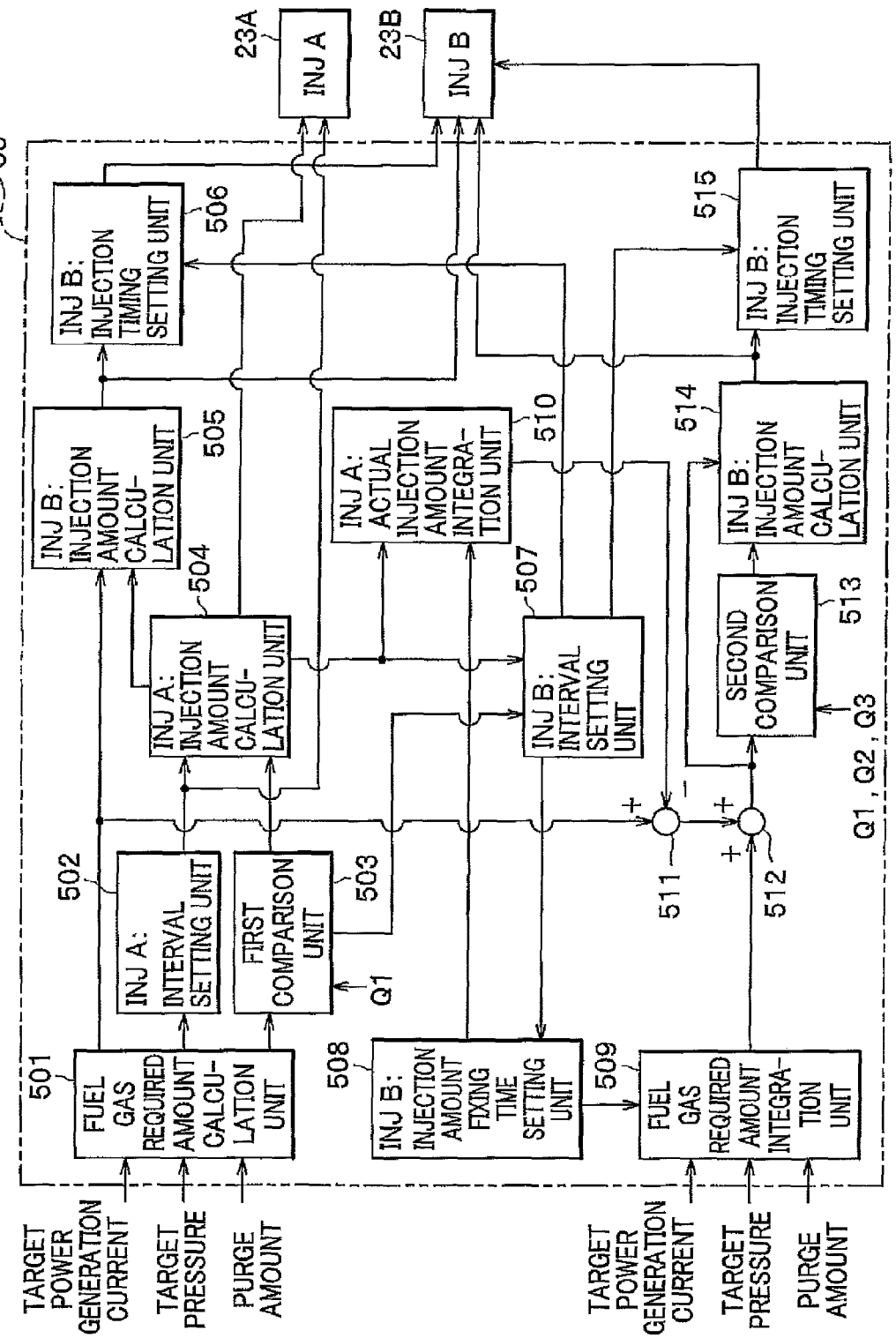
FIG. 2 is a block diagram showing a structure of a portion in an ECU relating to control of the injectors.

FIG. 2 is a block diagram showing the structure of a portion relating to the control of the injector out of the ECU 50. The fuel gas requirement amount calculation unit 501 (fuel gas requirement amount calculation means) calculates the hydrogen amount required for the electricity generation in the fuel cell 11. That is, the fuel gas requirement amount calculation unit 501 calculates the hydrogen amount (fuel gas requirement amount) that should be supplied to the fuel cell 11 based on, for example, the target generating current of the fuel cell 11, the target pressure of the anode fluidic channel 11a, and the purge amount upon the opening of the purge valve 25. Note that the target generating current is calculated in accordance with the above-described accelerator level information and has positive correlations with the opening of the accelerator 61. The target pressure of the anode fluidic channel 11a is calculated based on, for example, the detected value of the pressure sensor (not illustrated) installed in, for example, the piping a4 (refer to FIG. 1). The purge amount is calculated based on the valve opening time period of the purge valve 25.

The INJ A interval setting unit 502 (interval setting means) sets the interval of the injector 23A (first interval) according to the fuel gas requirement amount calculated by the fuel gas requirement amount calculation unit 501. As described above, "interval" means a time period (e.g., Int(A) in FIG. 5B) needed for one cycle upon opening and closing the injector 23A (or 23B). Although cases where an interval Int(A) of the injector 23A is constant will be described as an example in the present embodiment, the length of the interval Int(A) may be changed according to the fuel gas requirement amount.

At the interval starting time of the injector 23A (e.g., time t1 in FIGS. 5A to 5C), the first comparison unit 503 compares the fuel gas requirement amount with a threshold value Q1 (first threshold value—refer to FIG. 5A) and outputs the comparison result to the INJ A injection amount calculation unit 504 and the INJ B interval setting unit 507. Note that, the above-described threshold value Q1 is a value that can be used as a criterion of whether or not it is possible to supply hydrogen of an amount corresponding to the fuel gas requirement amount when hydrogen is injected with the maximum ON duty from only the injector 23A at the interval of the interval Int(A) of the injector 23A (A).

The INJ A injection amount calculation unit 504 (first valve opening time period calculation means) calculates the hydrogen amount (i.e., valve opening time [Ti value], or ON duty) that should be injected from the injector 23A during an interval of the injector 23A set by the INJ A interval setting unit 502. It should be noted that the valve opening time period of the injector 23A is calculated in accordance with the fuel gas requirement amount input from the fuel gas requirement amount calculation unit 501.

The INJ B injection amount calculation unit 505 (second valve opening time period calculation means) calculates the hydrogen amount (i.e., valve opening time [Ti value], or ON duty) that should be injected from the injector 23B when the fuel gas requirement amount is greater than or equal to the threshold value Q1. It should be noted that the injection amount is calculated by subtracting the injection amount of the injector 23A from the fuel gas requirement amount. That is, in the present embodiment, the injector 23B has a function to supplement hydrogen corresponding to an amount insufficient with the injection amount of the injector 23A with respect to the fuel gas requirement amount.

Figure 5:
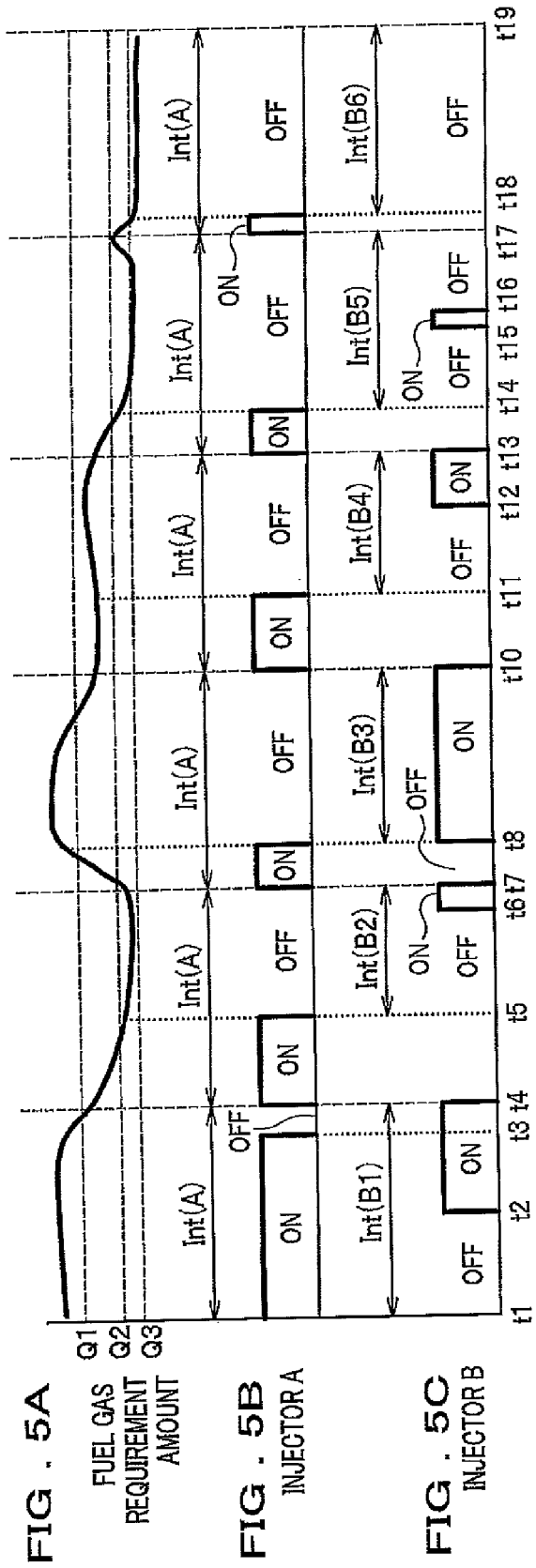
FIG. 5A is a time chart showing temporal changes in the fuel gas requirement amount.
FIG. 5B is a time chart showing temporal changes in ON/OFF of the injector A.
FIG. 5C is a time chart showing temporal changes in ON/OFF of the injector B.

The INJ B injection timing setting unit 506 (injection starting time setting means) sets the valve opening time of the injector 23B (time t2 in FIGS. 5A to 5C) such that the injection ending time of the injector 23B (time t4 in FIGS. 5A to 5C) matches with the ending time of the interval of the injector 23A (Int(A) in FIG. 5B).

When the fuel gas requirement amount is greater than or equal to the threshold value Q1 (refer to FIG. 5A), the INJ B interval setting unit 507 (interval setting means) carries out setting such that the interval of the injector 23B (Int(B1) in FIG. 5C) is in the same sectional period as the interval of the injector 23A (Int(A) in FIG. 5B). In addition, when the fuel gas requirement amount is less than the threshold value Q1, the INJ B interval setting unit 507 sets the valve closing time period of the injector 23A (e.g., time t5 to t7 in FIG. 5C) during the interval Int(A) as the interval of the injector 23B (Int(B2) in FIG. 5C).

The INJ B injection amount fixing time setting unit 508 sets the time when the injector 23A switches from VALVE OPEN (ON) to VALVE CLOSE (OFF) (i.e., time when the interval of the injector 23B is started—for example, time in FIG. 5C).

The fuel gas requirement amount integration unit 509 (fuel gas requirement amount calculation means) integrates the fuel gas requirement amount during the valve opening time period of the injector 23A (e.g., time t4 to t5 in FIG. 5B) at the interval of a predetermined cycle time period (sequentially summed). That is, the fuel gas requirement amount integration unit 509 calculates an amount corresponding to the increase of the fuel gas requirement amount from when the injector 23A is opened until the interval of the injector 23B is started. The INJ A actual injection amount integration unit 510 calculates the hydrogen amount actually injected from the injector 23A in a period from when the injector 23A is opened until the interval of the injector 23B is started (e.g., time t4 to t5 in FIG. 5C).

An adder subtracter 511 subtracts the above-described actual injection amount of the injector 23A from the fuel gas requirement amount calculated at the interval starting time of the injector 23A (e.g., time t4 in FIG. 5B). An adder 512 calculates the sum of an amount corresponding to the increase of the fuel gas requirement amount input from the fuel gas requirement amount integration unit 509 and the value input from the adder subtracter 511, and outputs the sum to the second comparison unit 513. That is, the value output from the adder 512 is a hydrogen amount corresponding to an amount insufficient with only the injector 23A at the interval starting time of the injector 23B.

The second comparison unit 513 compares the value input from the adder 512 with the predetermined threshold value Q1, Q2 and Q3 (Q1>Q2>Q3 —refer to FIG. 5A) and outputs the comparison result to the INJ B injection amount calculation unit 514. The INJ B injection amount calculation unit 514 (second valve opening time period calculation means) calculates the hydrogen amount that should be injected from the injector 23B (valve opening time [Ti value]) based on the value input from the adder 512 and the comparison result in the second comparison unit 513. The INJ B injection timing setting unit 515 (injection starting time setting means) sets the injection timing (valve opening time) of the injector 23B and outputs to the injector 23B based on the interval input from the INJ B interval setting unit 507 and the injection amount input from the INJ B injection amount calculation unit 514.

<Operation of the Fuel Cell System>

Hereinafter, flow charts shown in FIG. 3 and FIG. 4 will be described with reference to a time chart in FIGS. 5A to 5C. It should be noted that the flow charts shown in FIG. 3 and FIG. 4 correspond to processing performed during one interval of the injectors 23A and 23B (e.g., time t1 to t4, time t4 to t7, and time t7 to t10 shown in FIGS. 5B and 5C). That is, the ECU 50 repeats processing in Steps S101 to S127 successively for each interval of the injectors 23A and 23B.

Figure 3:
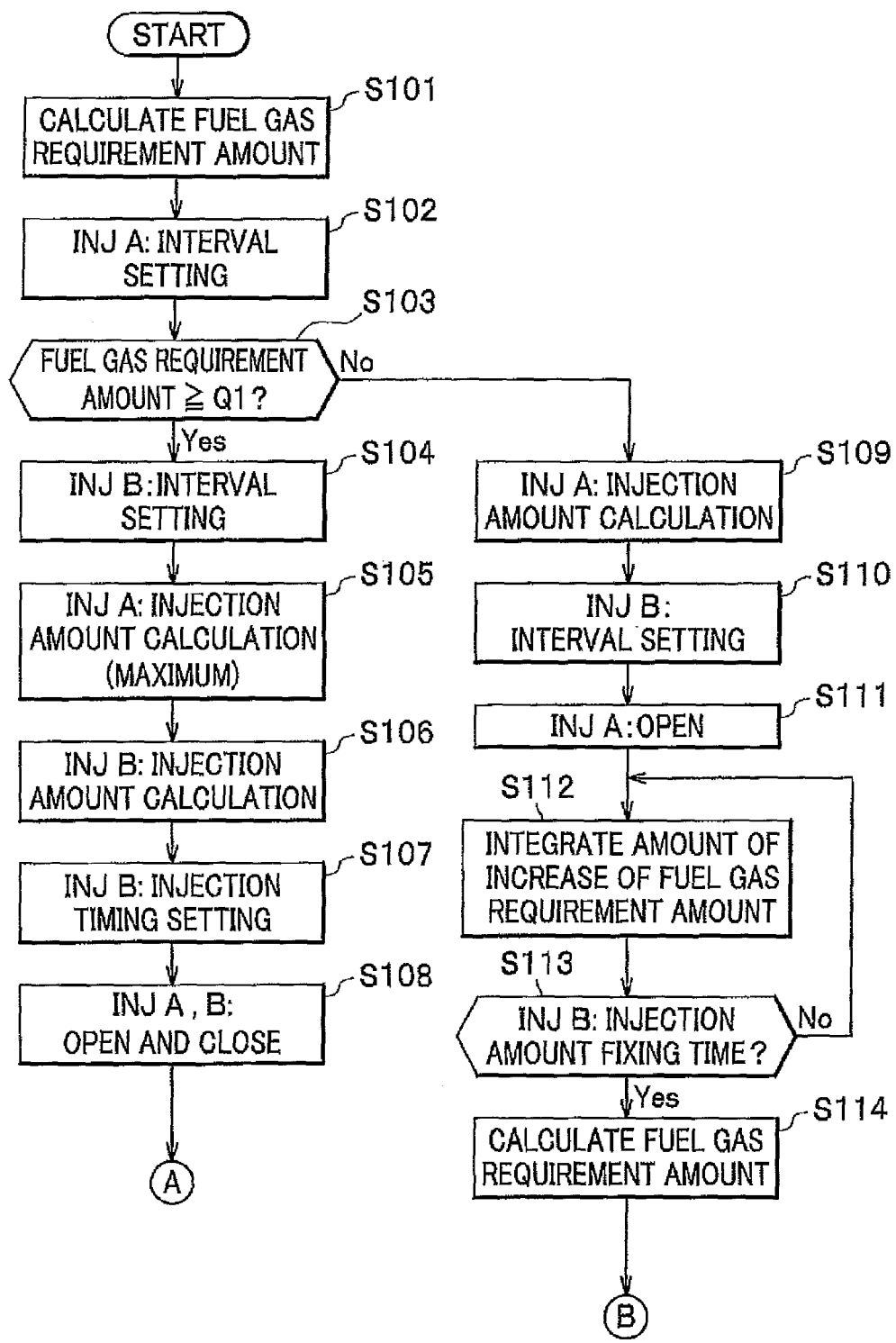
FIG. 3 is a flow chart showing the flow of operation of the ECU at the time of controlling each injector.

In Step S101 in FIG. 3, the ECU 50 (fuel gas requirement amount calculation unit 501) calculates the fuel gas requirement amount. That is, the ECU 50 calculates the hydrogen amount that should be supplied to the fuel cell 11 based on, for example, the target generating current of the fuel cell 11, the target pressure of the anode fluidic channel 11a, and the purge amount upon the purge valve 25 is opened. In Step S102, the ECU 50 (INJ A interval setting unit 502) sets the interval of the injector 23A based on the fuel gas requirement amount calculated in Step S101. Note that the example shown in FIG. 5B shows an example that assumes the interval Int(A) of the injector 23A as constant (e.g., 100 milliseconds).

In Step S103, the ECU 50 (first comparison unit 503) determines whether or not the fuel gas requirement amount at the interval starting time of the injector 23A is greater than or equal to the threshold value Q1 (first threshold value). If the fuel gas requirement amount is greater than or equal to the threshold value Q1, that is, if high power is required (S103->Yes), the processing of the ECU 50 advances to Step S104. It should be noted that the following steps S104-S107 are processing of a case where the assistance of hydrogen supply by the injector 23B is surely required, and correspond to the intervals Int(A) and Int(B1) during time t1 to t4 shown in FIGS. 5B and 5C (fuel gas requirement amount exceeds the threshold value Q1 at time t1 in FIG. 5A).

In Step S104 in FIG. 3, the ECU 50 (INJ B interval setting unit 507) sets the interval of the injector 23B according to the fuel gas requirement amount calculated in Step S101. That is, in Step S104, the ECU 50 sets the interval of the injector 23B to the same sectional period as the interval of the injector 23A (Int(B1) in FIG. 5C is set to the same sectional period as Int(A)). Thereby, the valve opening starting time of the injector 23B can be set to any time during the interval Int(A) of the injector 23A. Therefore, it is possible to supply fuel gas of large flow rate in accordance with the fuel gas requirement amount of the fuel cell 11.

It should be noted that, in the present embodiment, as shown in FIG. 5B, the ECU 50 opens and closes the injector 23A in the order of OPEN (ON)->CLOSE (OFF), and opens and closes the injector 23B in the order of CLOSE (OFF)->OPEN (ON) (or CLOSE->OPEN->CLOSE—refer to time t14 to t17).

In Step S105, the ECU 50 (INJ A injection amount calculation unit 504) calculates the hydrogen amount that should be injected from the injector 23A (valve opening time [Ti value]). It should be noted that, since the value of the fuel gas requirement amount is greater than or equal to Q1 (S103->Yes), the ECU 50 sets the Ti value of the injector 23A to the maximum (e.g., 90%). As described above, since there is a time lag (invalid time) from the electrification until the valve is actually is opened in the injectors 23A and 23B, the Ti value takes a value less than 100% even if the Ti value is the maximum.

In Step S106, the ECU 50 (INJ B injection amount calculation unit 505) calculates an injection amount of the injector 23B by subtracting the injection amount of the injector 23A from the fuel gas requirement amount. In Step S107, the ECU 50 (INJ B injection timing setting unit 506) sets the injection timing of the injector 23B. That is, the ECU 50 sets the injection starting time of the injector 23B such that the injector 23B is in a VALVE OPEN state at least during when the injector 23A is VALVE CLOSE.

Thereby, the valve opening of the injector 23B is also started during when the injector 23A is opened and it is possible to supply hydrogen continuously even when the fuel gas requirement amount is greater than or equal to the threshold value Q1. In the example shown in FIG. 5C, the ECU 50 sets the valve opening time of the injector 23B (time t2 in FIG. 5C) such that the valve closing time of the injector 23B (time t4 in FIG. 5C) matches with the ending time of the interval of the injector 23A (Int(A) in FIG. 5B). In Step S108, the ECU 50 controls opening and closing of the injectors 23A and 23B based on the interval, the injection amount, and injection timing, which are set in the processing in Steps S101-S107.

In addition, if the fuel gas requirement amount is less than the threshold value Q1, that is, if low power is required (S103->No), the processing of the ECU 50 advances to Step S109. It should be noted that the processing in Steps S109-S127 corresponds to the case where the determination of whether or not hydrogen supply is necessary by the injector 23B is performed at the valve closing time of the injector 23A (e.g., time t5 in FIG. 5B).

In Step S109, the ECU 50 (INJ A injection amount calculation unit 504) calculates the hydrogen amount that should be injected from the injector 23A (valve opening time [Ti value]). The hydrogen amount is calculated in accordance with the value of the fuel gas requirement amount at the interval starting time of the injector 23A (e.g., time t4 in FIG. 5B).

In Step S110, the ECU 50 (INJ B interval setting unit 507) sets the interval of the injector 23B. That is, the ECU 50 sets the valve closing time period of the injector 23A (e.g., time t5 to t7 in FIG. 5B) to the interval of the injector 23B. Note that the valve closing time period of the injector 23A can be obtained by subtracting the valve opening time of the injector 23A (time t4 to t5 in FIG. 5B) from the interval of the injector 23A (Int(A) in FIG. 5B).

In addition, for example, the sectional period of time t4 to t5 shown in FIG. 5C is not included in the interval of the injector 23B. During the sectional period, the ECU 50 supervises whether or not the valve opening time period of the injector 23A has ended, and thus the injector 23B is in a VALVE CLOSE state. In Step S111, the ECU 50 opens the injector 23A such that the injection amount calculated in Step S109 is supplied.

In Step S112, the ECU 50 (fuel gas requirement amount integration unit 509) integrates the amount corresponding to the increase of the fuel gas requirement amount during when the injector 23A is opened at the intervals of a predetermined cycle time period (e.g., 10 milliseconds). In Step S113, the ECU 50 (INJ B injection amount fixing time setting unit 508) determines whether or not it has become the injection amount fixing time of the injector 23B, that is, the time when the injector 23A switches from VALVE OPEN (ON) to VALVE CLOSE (OFF) (e.g., time t5 in FIG. 5B).

When it has become the injection amount fixing time of the injector 23B (S113->Yes), the processing of the ECU 50 advances to Step S114. It should be noted that the injector 23A switches from VALVE OPEN state to VALVE CLOSE state at the injection amount fixing time of the injector 23B. Meanwhile, if it is before the injection amount fixing time of the injector 23B, (S113->No), the processing of the ECU 50 returns to Step S112.

In Step S114, the ECU 50 (the adder subtracter 511 and the adder 512) calculates the above-described fuel gas requirement amount at the injection amount fixing time of the injector 23B. That is, the ECU 50 subtracts the actual injection amount during the valve opening time of the injector 23A (time t4 to t5 in FIG. 5B) from the fuel gas requirement amount calculated at the interval starting time of the injector 23A (e.g., time t4 in FIG. 5B) and furthermore adds an amount corresponding to the increase of the fuel gas requirement amount during time t4 to t5. Thereby, it is possible to calculate the hydrogen amount substantially required by the injector 23B at the valve closing time of the injector 23A (time t5 in FIGS. 5B and 5C).

Figure 4:
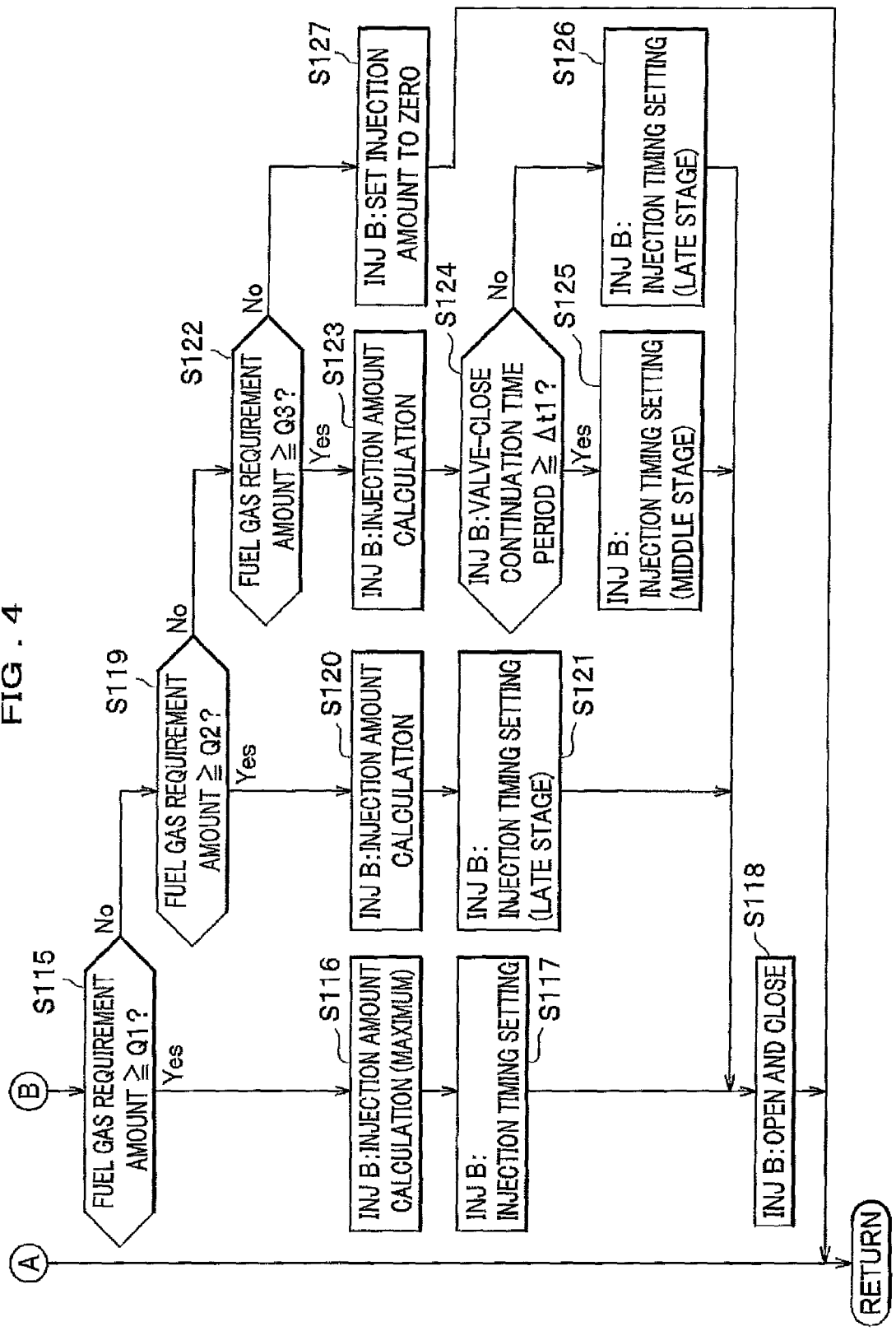
FIG. 4 is a flow chart showing the flow of operation of the ECU at the time of controlling each injector.

In Step S115 in FIG. 4, the ECU 50 (second comparison unit 513) determines whether or not the fuel gas requirement amount calculated in Step S114 is greater than or equal to the threshold value Q1. If the fuel gas requirement amount is greater than or equal to the threshold value Q1 (S115->Yes), the processing of the ECU 50 advances to Step S116. In Step S116, the ECU 50 (INJ B injection amount calculation unit 514) calculates the hydrogen amount (valve opening time [Ti value]) that should be injected from the injector 23B based on the fuel gas requirement amount calculated in Step S114 and the comparison result in Step S115.

For example, the fuel gas requirement amount at time t7 in FIG. 5A is less than Q1 (S103->No) and thus is a relatively small value. Thereafter, the fuel gas requirement amount increases rapidly by the opening of the accelerator 61 increasing rapidly, and therefore the fuel gas requirement amount at time t8 is greater than or equal to Q1 (S115->Yes). In such a case, the ECU 50 carries out setting such that the Ti value of the injector 23B is the maximum. Thereby, it is possible to respond immediately even when the fuel gas requirement amount has increased rapidly.

In Step S117, the ECU 50 (INJ B injection timing setting unit 515) sets the injection timing of the injector 23B (valve opening time) and outputs to the injector 23B based on the interval and the injection amount of the injector 23B. That is, when the fuel required amount at the valve closing time of the injector 23A (e.g., time t8 in FIG. 5B) is greater than or equal to Q1 (S115->Yes), the ECU 50 sets the injection timing of the injector 23B (time t8 in FIG. 5C) such that the valve closing time of the injector 23B (time t10 in FIG. 5C) matches with the ending time of the interval Int(A) of the injector 23A. Thereby, it is possible to supply hydrogen appropriately and avoid deficiency in stoichiometry even when the fuel gas requirement amount has increased furthermore after the valve closing of the injector 23A. In Step S118, the ECU 50 controls opening and closing of the injector 23B based on the injection amount and the injection timing set in Steps S116 and S117.

In addition, when the fuel gas requirement amount is less than the threshold value Q1 (S115->No), the processing of the ECU advances to Step S119. In Step S119, the ECU 50 (second comparison unit 513) determines whether or not the fuel gas requirement amount calculated in Step S114 is greater than or equal to a threshold value Q2 (second threshold value). It should be noted that the threshold value Q2 is a value smaller than the above-described threshold value Q1, and is set in advance and stored in a memory means (not illustrated). The threshold value Q2 is a value that serves as a criterion of whether or not the assistance of hydrogen supply by the injector 23B is necessary at the valve closing time of the injector 23A. When the fuel gas requirement amount is greater than or equal to the threshold value Q2 (S119->Yes), the processing of the ECU 50 advances to Step S120.

In Step S120, the ECU 50 (INJ B injection amount calculation unit 514) calculates the hydrogen amount (valve opening time [Ti value]) that should be injected from the injector 23B based on the fuel gas requirement amount calculated in Step S114 and the comparison result in Step S119, for example, the ECU 50 calculates the Ti value of the injector 23B according to the fuel gas requirement amount at time t11 in FIG. 5A (greater than equal to Q2 and less than Q1). In Step S121, the ECU 50 (INJ B injection timing setting unit 515) sets the injection timing of the injector 23B and controls opening and closing of the injector 23B based on the interval and the injection amount of the injector 23B (S118).

That is, the ECU 50 sets the injection timing of the injector 23B (time t12 in FIG. 5C) such that the valve closing time of the injector 23B (e.g., time t13 in FIG. 5C) matches with the ending time of the interval Int(A) of the injector 23A. Thus, by opening the valve of the injector 23B in the latter half of the interval, it is possible to avoid deficiencies in stoichiometry when the fuel gas requirement amount increases during the valve closing time of the injector 23A.

When the fuel gas requirement amount is less than the threshold value Q2 in Step S119 (S119->No), the processing of the ECU 50 advances to Step S122. In Step S122, the ECU 50 (second comparison unit 513) determines whether or not the fuel gas requirement amount calculated in Step S114 is greater than or equal to the threshold value Q3 (third threshold value). It should be noted that the threshold value Q3 is a value smaller than the above-described threshold value Q2, and is set in advance and stored in a memory means (not illustrated). The threshold value Q3 is a value that serves as a criterion of whether or not the assistance of hydrogen supply by the injector 23B is unnecessary during the interval Int(A) at the starting time of the interval Int(A) of the injector 23A. When the fuel gas requirement amount is greater than or equal to the threshold value Q3 (S122->Yes), the processing of the ECU 50 advances to Step S123.

In Step S123, the ECU 50 (INJ B injection amount calculation unit 514) calculates the hydrogen amount (valve opening time [Ti value]) that should be injected from the injector 23B based on the fuel gas requirement amount calculated in Step S114 and the comparison result in Step S122. For example, the ECU 50 calculates the Ti value of the injector 23B according to the fuel gas requirement amount at time t14 in FIG. 5A (greater than or equal to Q3 and less than Q2). In Step S124, the ECU 50 (INJ B injection timing setting unit 515) determines whether or not the valve closing continuation time period of the injector 23B set in Step S110 in FIG. 3 is greater than or equal to a predetermined value Δt1. The above-described "valve closing continuation time" is calculated by subtracting the valve opening time period from of the injector 23B from the interval Int(B) of the injector 23B. It should be noted that the predetermined value Δt1 is a value of time shorter than the interval Int(A) of the injector 23A and is set in advance.

When the valve closing continuation time period of the injector 23B is greater than or equal to the predetermined value Δt1 (S124->Yes), the processing of the ECU 50 advances to Step S125. In Step S125, the ECU 50 (INJ B injection timing setting unit 515) sets the injection timing of the injector 23B (time t15 in FIG. 5C) and controls opening and closing of the injector 23B such that the valve opening time period of the injector 23B (time t15 to t16 in FIG. 5C) is substantially at the middle stage in the interval Int(B5) of the injector 23B (S118). That is, the ECU 50 sets the injection starting time of the injector 23B such that the valve closing continuation time period of the injector 23B during the interval Int(B5) does not become greater than or equal to a predetermined value. Thereby, hydrogen supplied from the injectors 23A and 23B is brought close to a continuous flow and deficiencies in stoichiometry can be avoided.

In addition, when the valve closing continuation time period of the injector 23B is less than a predetermined value Δt1 (S124->No), the processing of the ECU 50 advances to Step S126. In Step S126, the ECU 50 (INJ B injection timing setting unit 515) sets the injection timing of the injector 23B (time t6 in FIG. 5C) and controls opening and closing of the injector 23B such that the time of closing the valve of the injector 23B (e.g., time t7 in FIG. 5C) matches with the ending time of the interval Int(A) of the injector 23A (S118). Thereby, for example, even when the fuel gas requirement amount increases during time t5 to t7 in FIG. 5A, it is possible to carry out hydrogen supply appropriately by opening the valve of the injector 23B in the latter half of the interval.

When the fuel gas requirement amount is less than the threshold value Q3 in Step S122 (S122->No), the processing of the ECU 50 advances to Step S127. In Step S127, the ECU 50 (INJ B injection timing setting unit 515) sets the injection amount of the injector 23B to zero. For example, the fuel gas requirement amount at time t18 shown in FIG. 5A is less than the threshold value Q3. In this case, since the possibility that the fuel gas requirement amount increases during the interval Int(B6) of the injector 23B is low, the ECU 50 sets the Ti value of the injector 23B to zero. Thereby, it is possible to prevent needless hydrogen supply and use hydrogen efficiently.

<Advantageous Effects>

According to the fuel cell system S1 in accordance with the present embodiment, hydrogen is injected from the injector 23A fundamentally during intervals of the injectors 23A and 23B, and hydrogen is supplied to the anode fluidic channel 11a through the ejector 24 (refer to FIG. 1). Thereby, since negative pressure is produced in the circumference of the nozzle 24p (not illustrated) of the ejector 24 and non-reacted hydrogen circulates in the circulation fluidic channel containing the piping a4, the anode fluidic channel 11a, and the piping a5 and a6, hydrogen can be used efficiently.

In addition, when the fuel gas requirement amount is greater than or equal to the threshold value Q1 at the interval starting time of the injector 23A (S103->Yes), the ECU 50 makes the Ti value of the injector 23A the maximum (S105) and makes hydrogen corresponding to insufficient amount assisted by the injector 23B (S106). Therefore, it is possible to respond appropriately even when hydrogen of large flow rate is necessary from the interval starting time of the injector 23A. In addition, in such a case, the valve closing time of the injector 23B (time t4 in FIG. 5C) is made to match with the interval ending time of the injector 23A (S107). Thereby, it is possible to supply hydrogen continuously during the interval sectional period of the injector 23A. As a result, it is possible to avoid deficiencies in stoichiometry reliably and improve power generation performance of the fuel cell 11.

In addition, when the fuel gas requirement amount is less than the threshold value Q1 at the interval starting time of the injector 23A (S103->No), the ECU 50 calculates the injection amount of the injector 23B (valve opening time [Ti value]) according to the fuel gas requirement amount at the interval valve closing time of the injector 23A. Thus, by calculating the injection amount of the injector 23B at the valve closing time of the injector 23A, it is possible to assist the fuel gas corresponding to an amount that cannot be dealt with during the valve closing time period of the injector 23A by the injector 23B neither too much nor too less.

In addition, by delaying the calculation timing of the injection amount of the injector 23B as compared to the calculation timing of the injection amount of the injector 23A, it is possible to avoid deficiencies in stoichiometry by dealing immediately even when the fuel gas requirement amount increases rapidly. Furthermore, supply of hydrogen can be brought close to a continuous flow by opening the injectors 23A and 23B alternately in time.

In addition, when the valve closing continuation time period of the injector 23B is relatively short (S124->No), the injector 23B is opened in the late stage of the interval (S126). Thereby, even when the fuel gas requirement amount has increased during the valve closing time period of the injector 23A, it is possible to supplement the insufficient amount with hydrogen injected from the injector 23B. Thus, in the present embodiment, hydrogen can be appropriately supplied neither too much nor too less by calculating the fuel gas requirement amount at the time of valve opening and valve ending of the injector 23A and setting the injection amount and the injection timing of the injector 23B according to the calculated result. As a result, it is possible to improve the power generation performance of the fuel cell system S1 by preventing deficiencies in stoichiometry in the fuel cell 11.

<<Second Embodiment>>

The second embodiment is different from the first embodiment in that an injector 23C (not illustrated) connected in parallel with the injector 23B is added and the way to control the injectors. However, other points are the same as in the first embodiment. Therefore, different portions will be described but descriptions that overlap with the first embodiment will be omitted.

The injector 23C (not illustrated) is connected in parallel with the injector 23B as described above. That is, the upstream side of the injector 23C is connected to the piping a2 (refer to FIG. 1) through piping (not illustrated) and the downstream side of the injector 23C is connected to the piping a4 (refer to FIG. 1) through piping (not illustrated). It should be noted that the bore diameter of the nozzle included in the injector 23C in the present embodiment is smaller than the bore diameter of the nozzle included in the injector 23B.

<Operation of the Fuel Cell System>

Figure 6:
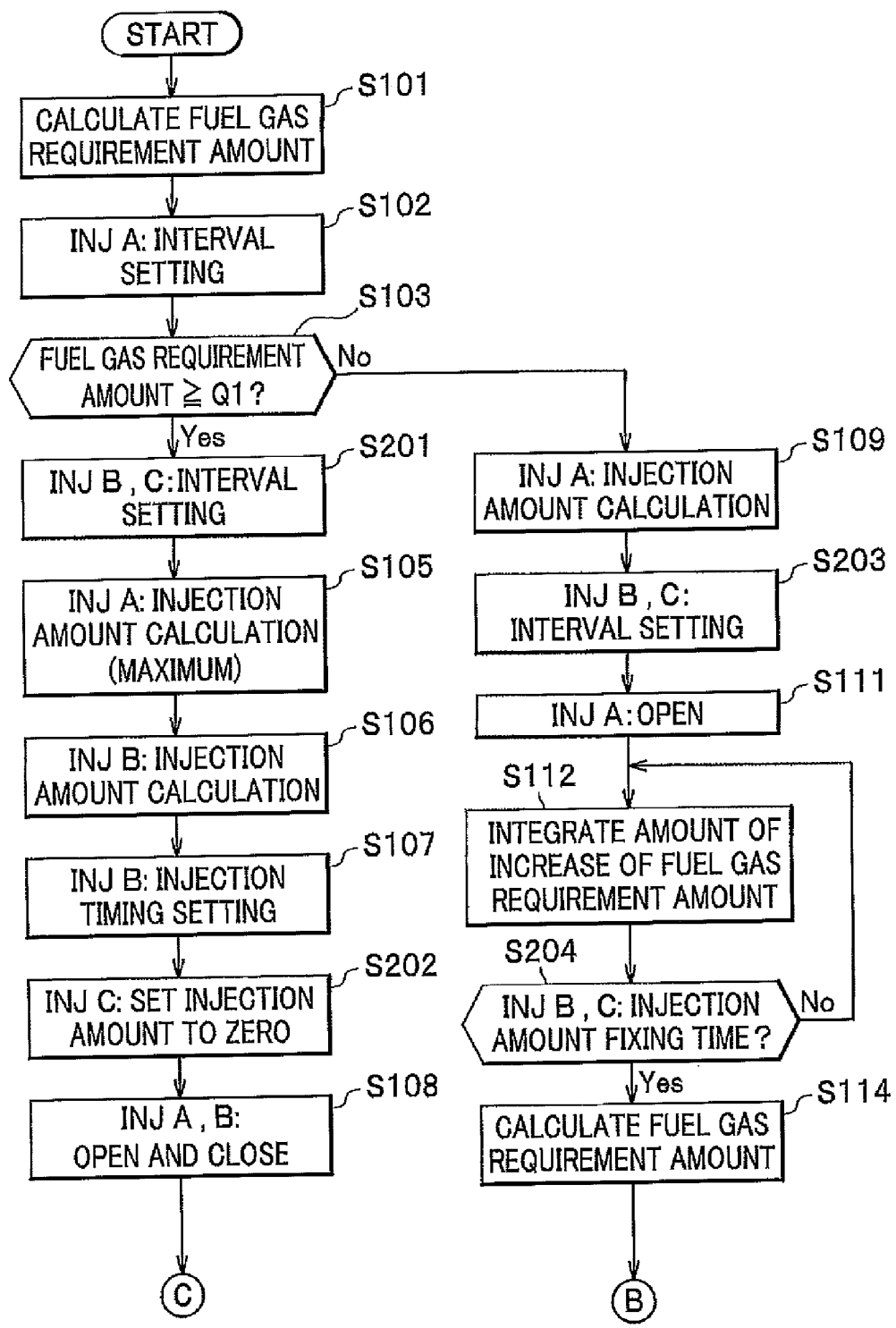
FIG. 6 is a flow chart showing the flow of operation of the ECU at the time of controlling each injector in a fuel cell system according to the second embodiment of the present invention.

Next, flow charts shown in FIG. 6 and FIG. 7 will be described with reference to the time chart in FIGS. 8A to 8D. It should be noted that the same step number is used for processing that is similar to the processing (FIG. 3 and FIG. 4) described in the first embodiment in the flow charts in FIG. 6 and FIG. 7. Steps S101-S103 in FIG. 6 are similar to Steps S101-S103 (refer to FIG. 3) described for the first embodiment. Next, in Step S201, the ECU 50 sets the interval of the injectors 23B and 23C according to the fuel gas requirement amount calculated in Step S101.

That is, in Step S201, the ECU 50 sets the intervals Int(B) and Int(C) of the injectors 23B and 23C as the same sectional period as the interval Int(A) of the injector 23A. As shown in time t1 to t4 in FIGS. 5B and 5C, this is for opening the valves of the injector 23A and the injector 23B in a way that overlap in time and making the injector 23C to a valve closing state.

Steps S105-S107 and S108 in FIG. 6 are similar to that of processing in Steps S105-S107 and S108 (refer to FIG. 3), which are described for the first embodiment. That is, the ECU 50 calculates, for example, an injection amount of the injectors 23A and 23B such that the fuel gas requirement amount calculated at time t1 is met. Next, in Step S202, the ECU 50 makes the injection amount of the injector 23C zero. That is, when the fuel gas requirement amount is greater than or equal to Q1 (S103->Yes), the ECU 50 performs hydrogen supply only using the injectors 23A and 23B. Thus, it is possible to assist hydrogen supply of the injector 23A appropriately by using an injector 23B with large bore diameter of the nozzle. It should be noted that the injector 23C maybe opened instead of the injector 23B in order to use the injectors 23B and 23C substantially the same frequency with each other.

When the fuel gas requirement amount is less than the threshold value Q1 (S103->No), the ECU 50 sets the interval of the injectors 23B and 23C (S203) and opens the valve of the injector 23A (S111) after calculating the injection amount of the injector 23A (S109). That is, in Step S203, the ECU 50 sets the valve closing time of the injector 23A (e.g., time t8 to t10 in FIG. 8B) to the intervals Int(B3) and Int(C3) of the injectors 23B and 23C.

Next, the ECU 50 calculates an amount corresponding to the increase of the fuel gas requirement amount (S112), and determines whether or not the amount has become the injection amount fixing time of the injectors 23B and 23C (e.g., time t5 in FIGS. 8C and 8D) (S204). When it has become the injection amount fixing time of the injectors 23B and 23C (S204->Yes), the processing of the ECU 50 advances to Step S114. Meanwhile, if it has not become the injection amount fixing time of the injectors 23B and 23C (S204->No), the processing of the ECU 50 returns to Step S112.

Figure 7:
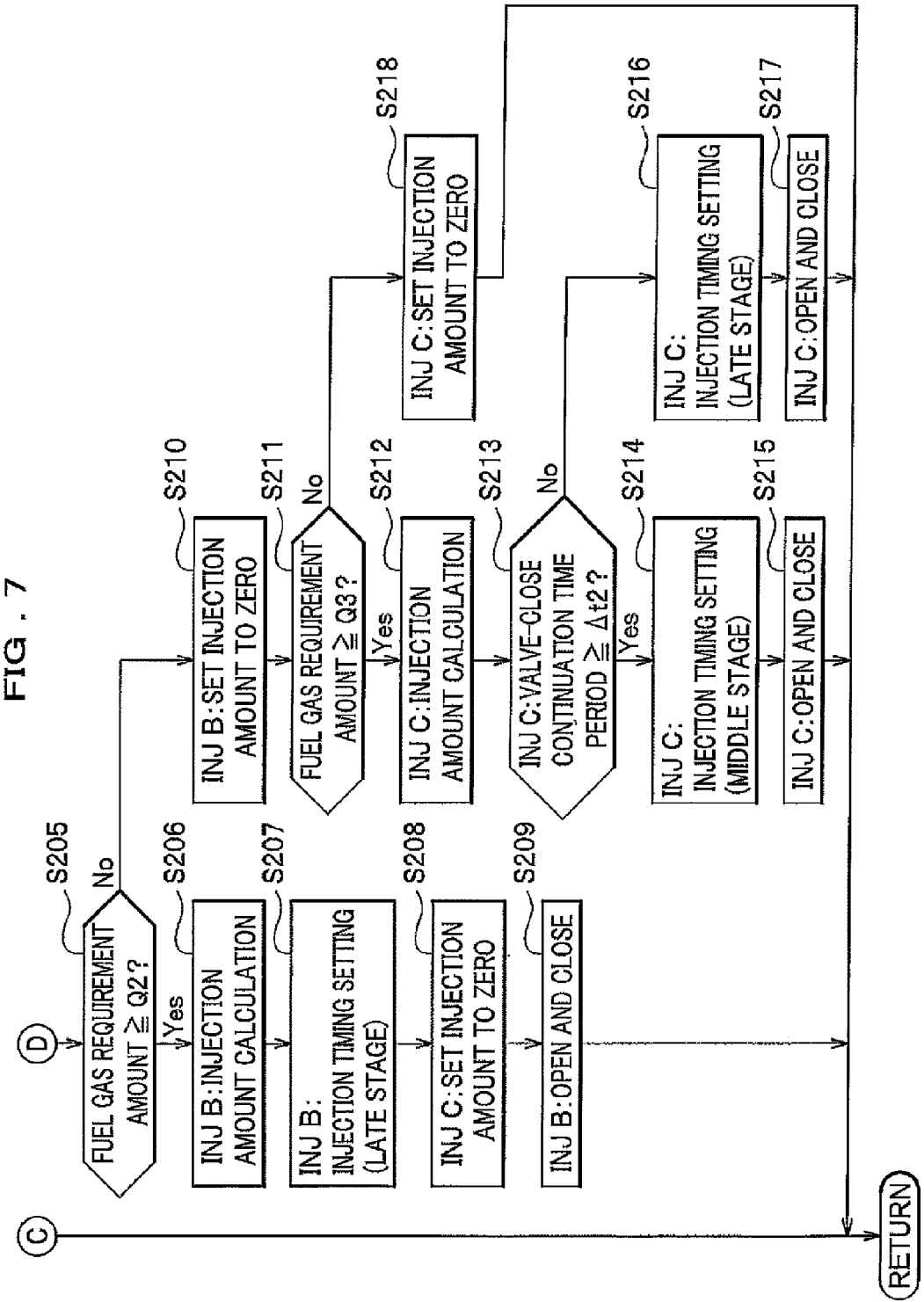
FIG. 7 is a flow chart showing the flow of operation of the ECU at the time of controlling each injector.
Figure 8:
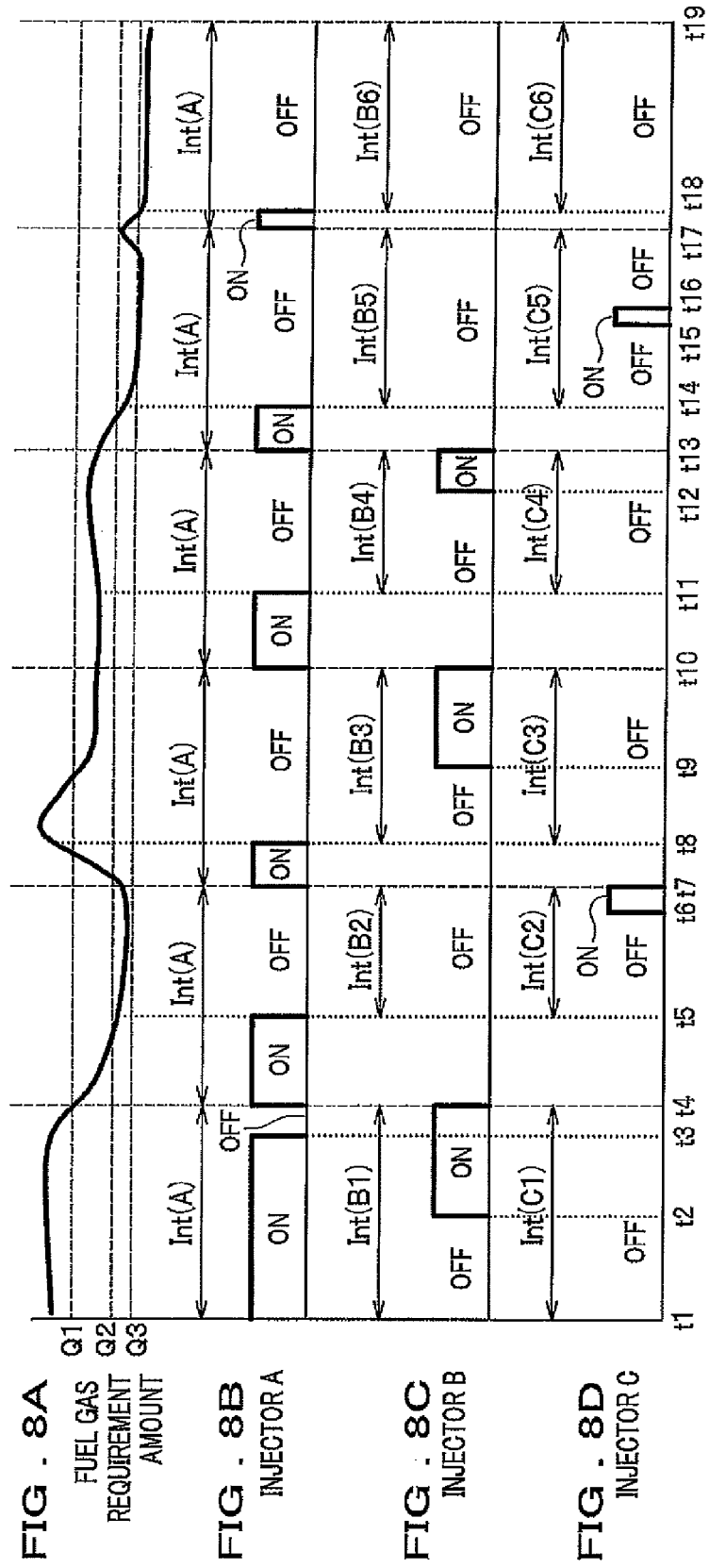
FIG. 8A is a time chart showing temporal changes in the fuel gas requirement amount.
FIG. 8B is a time chart showing temporal changes in ON/OFF of the injector A.
FIG. 8C is a time chart showing temporal changes in ON/OFF of the injector B.
FIG. 8D is a time chart showing temporal changes in ON/OFF of the injector C.

Next, the ECU 50 calculates the fuel gas requirement amount at the valve opening ending time of the injector 23A (S114), and determines whether or not the fuel gas requirement amount is greater than or equal to the threshold value Q2 in Step S205 in FIG. 7. As described above, the threshold value Q2 is a value smaller than the threshold value Q1 and is set in advance. In Step S206, the ECU 50 calculates the hydrogen amount that should be injected from the injector 23B. Next, in Step S207, the ECU 50 sets the injection timing of the injector 23B so as to open the valve in the late stage of the interval Int(B) (e.g., time t9 and t12 in FIG. 8C). As described above, since the bore diameter of the nozzle of the injector 23B is relatively large, it is possible to deal with the fuel gas requirement amount greater than or equal to the threshold value Q2 and control the injection amount appropriately by setting the Ti value as appropriate.

In addition, hydrogen of large flow rate can be injected with electrification of short time by performing hydrogen supply using the injector 23B having large bore diameter of the nozzle. Therefore, it is possible to shorten the electrifying time onto the injector 23B and reduce power dissipation of the injector 23B. In Step S208, the ECU 50 sets the injection amount of the injector 23C to zero and controls opening and closing of the injector 23B (S209).

In addition, when the fuel gas requirement amount is less than the threshold value Q2 (S205->No), the processing of the ECU 50 advances to Step S210. In Step S210, the ECU 50 sets the injection amount of the injector 23B to zero. In Step S211, the ECU 50 determines whether or not the fuel gas requirement amount calculated in Step S114 is greater than or equal to the threshold value Q3. As described above, the threshold value Q3 is a value smaller than the threshold value Q2 and is set in advance.

When the fuel gas requirement amount is greater than or equal to the threshold value Q3 (S211->Yes), the processing of the ECU 50 advances to Step S212. In Step S212, the ECU 50 calculates the hydrogen amount (valve opening time [Ti value]) that should be injected from the injector 23C. For example, the ECU 50 calculates the Ti value of the injector 23C according to the fuel gas requirement amount (greater than or equal to Q3 and less than Q2) at time t5 in FIG. 8A.

In Step S213, the ECU 50 determines whether or not the valve closing continuation time period of the injector 23C is greater than or equal to a predetermined value Δt2. It should be noted that the predetermined value Δt2 is time shorter than the interval Int(A) of the injector 23A and is set in advance. When the valve closing continuation time period of the injector 23C is greater than or equal to the predetermined value Δt2 (S213->Yes), the processing of the ECU 50 advances to Step S214. In Step S214, the ECU 50 sets the injection timing of the injector 23C (time t15 in FIG. 8D) and controls opening and closing of the injector 23C (S215) such that the valve opening time of the injector 23C (time t15 to t16 in FIG. 8D) is substantially at the middle stage of the interval Int(C5) of the injector 23C In addition, when the valve closing continuation time period of the injector 23C is less than the predetermined value Δt2 (S213->No), the processing of the ECU 50 advances to Step S216. In Step S216, the ECU 50 sets the injection timing of the injector 23C so as to open the valve in the late stage of the interval Int(C2) (e.g., time t6 in FIG. 8D), and controls opening and closing of the injector 23C (S217).

When the fuel gas requirement amount is less than the threshold value Q3 in Step S211 (S211->No), the processing of the ECU 50 advances to Step S218. In Step S218, the ECU 50 sets the injection amount of the injector 23C (valve opening time [Ti value]) to zero.

Thus, in the present embodiment, when the fuel gas requirement amount at the valve closing time of the injector 23A is less than the threshold value Q2 (S205->No), hydrogen supply is assisted using the injector 23C having small bore diameter of the nozzle. Thereby, it is possible to control hydrogen injection amount finely and supply hydrogen to the fuel cell 11 neither too much nor too less.

<Advantageous Effects>

The present embodiment has a structure in which hydrogen supply of the injector 23A is assisted by the injectors 23B and 23C that have different bore diameters of the nozzle with each other. Suppose the fuel gas requirement amount has increased rapidly (S205->Yes), it is possible to supply immediately hydrogen corresponding to a shortage amount by adjusting the Ti value of the injector 23B as appropriate and avoid deficiencies in stoichiometry. In addition, it is possible to shorten the electrifying time and reduce power dissipation required for the injector 23B by using the injector 23B having large bore diameter of the nozzle, and therefore it is possible to reduce power dissipation required for the injector 23B.

In addition, when the fuel gas requirement amount at the valve closing time of the injector 23A is less than the threshold value Q2 (S205->No), the injector 23A is assisted with hydrogen supply by opening the injector 23C. Thus, according to the fuel gas requirement amount, hydrogen can be supplied the neither too much nor too less by adjusting as appropriate Ti value of the injector 23C with the small bore diameter of the nozzle.

<<Third Embodiment>>

Next, the third embodiment will be described with reference to FIG. 9 to FIG. 18D. The third embodiment is different from the first embodiment in that pressure of hydrogen that flows through the anode fluidic channel 11a is subjected to feedback control so as to match with the target pressure P0 (refer to FIG. 13A) and the structure of the ECU 50 but other parts are the same as that of the first embodiment. Therefore, the different portions will be described and descriptions will be omitted for the portions that overlap with the first embodiment.

There is provided with a pressure sensor (not illustrated) which detects pressure of hydrogen directed to the anode fluidic channel 11a (hereafter referred to as "anode pressure") in the piping a4 connected to the inlet of the anode fluidic channel 11a (refer to FIG. 1)

The ECU 50 (refer to FIG. 9) controls the injectors 23A and 23B by comparing the anode pressure, which is the amount to be controlled, with the target pressure P0 and making the anode pressure match with the target pressure P0 according to the comparison result. It should be noted that, the target pressure P0 is a fixed value in the present embodiment.

<Structure of the ECU>

Figure 9:
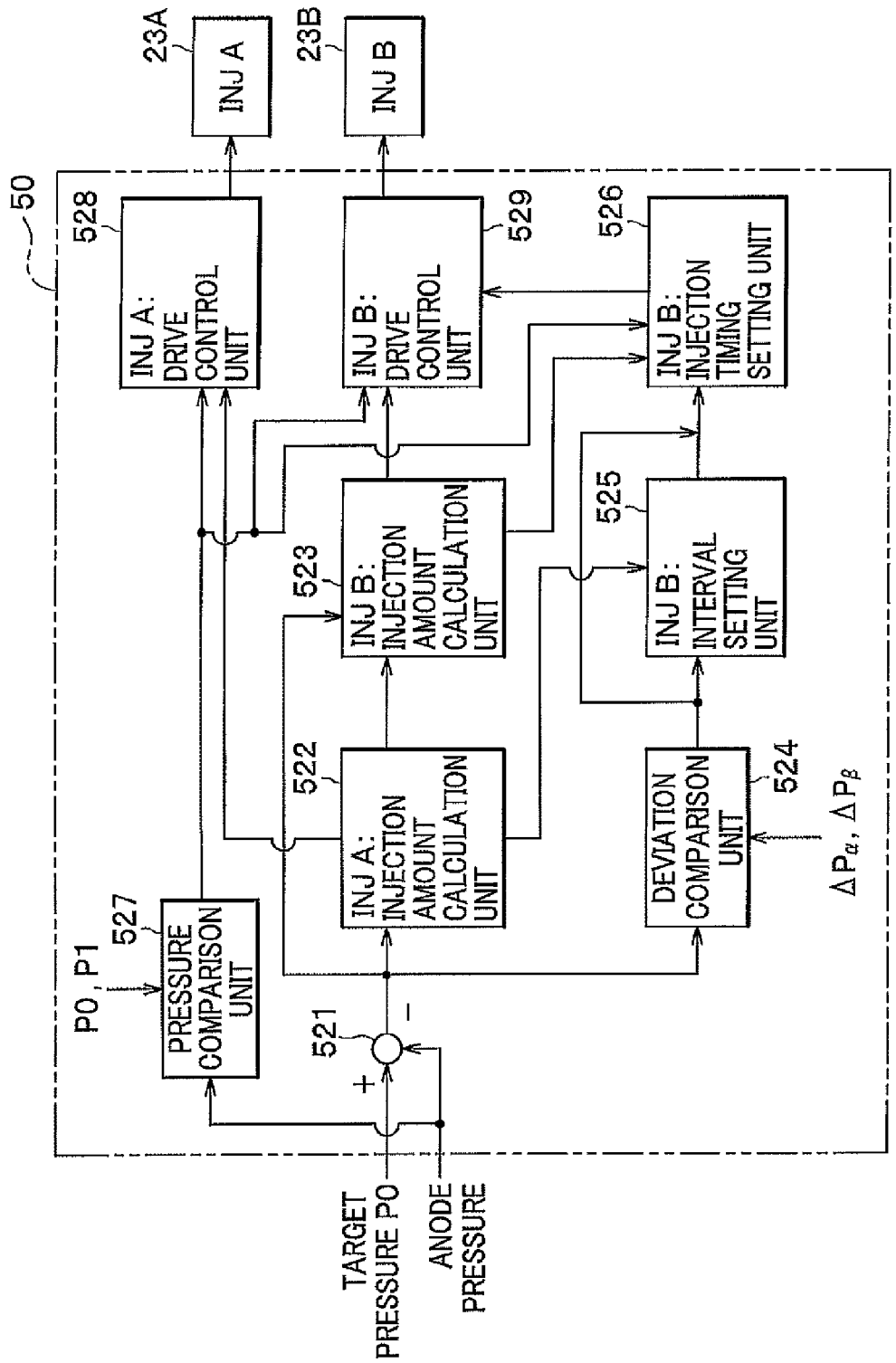
FIG. 9 is a block diagram showing a structure of a portion relating to control of the injector out of the ECU included in the fuel cell system according to the third embodiment of the present inventions.

FIG. 9 is a block diagram showing the structure of a portion related to control of the injector out of the ECU included in the fuel cell system according to the present embodiment. The adder subtracter 521 calculates deviation ΔP by subtracting anode pressure from the above-described target pressure P0 and outputs the deviation ΔP to the INJ A injection amount calculation unit 522, the INJ B injection amount calculation unit 523, and the deviation comparison unit 524. It should be noted that the target pressure P0 corresponds to the target value of hydrogen amount (fuel gas supply amount) supplied to the fuel cell 11.

The INJ A injection amount calculation unit 522 calculates the hydrogen amount that should be injected from the injector 23A (valve opening time [Ti value]) based on the deviation ΔP input from the adder subtracter 521. It should be noted that hydrogen amount that should be injected from the injector 23A increases as the deviation ΔP is larger (that is, as the insufficient amount of anode pressure with respect to the target pressure P0 is larger). The INJ A injection amount calculation unit 522 outputs the hydrogen amount thus calculated to the INJ B injection amount calculation unit 523, the INJ B interval setting unit 525, and the INJ A drive control unit 528.

The INJ B injection amount calculation unit 523 calculates the hydrogen amount that should be injected from the injector 23B based on the deviation ΔP input from the adder subtracter 521 and the hydrogen amount input from the INJ A injection amount calculation unit 522. That is, the INJ B injection amount calculation unit 523 calculates the hydrogen amount that should be injected from the injector 23B so as to supplement the hydrogen amount corresponding to the amount insufficient with only the injector 23A. The INJ B injection amount calculation unit 523 outputs the calculated hydrogen amount to the INJ B injection timing setting unit 526 and the INJ B drive control unit 529.

In addition, when information meaning that anode pressure is less than a threshold value P1 is input from the pressure comparison unit 527, the INJ B injection amount calculation unit 523 calculates the injection amount of the injector 23B based on the comparison result.

The deviation comparison unit 524 compares the deviation ΔP input from the adder subtracter 521 with predetermined threshold values $\Delta P_\alpha$ and $\Delta P_\beta$ ($\Delta P_\alpha > \Delta P_\beta$) at the interval starting time of the injector 23A, respectively. The deviation comparison unit 524 outputs the comparison result to the INJ B interval setting unit 525 and the INJ B injection timing setting unit 526. It should be noted that the threshold values $\Delta P_\alpha$ and $\Delta P_\beta$ will be described later.

The INJ B interval setting unit 525 sets the interval of the injector 23B based on the injection amount input from the INJ A injection amount calculation unit 522 and the comparison result input from the deviation comparison unit 524. For example, when the deviation ΔP at the interval starting time is relatively large (greater than or equal to $\Delta P_\alpha$), the INJ B interval setting unit 525 makes the interval Int(B1) of the injector 23B match with the interval Int(A) of the injector 23A (time t1 to t4 in FIGS. 13B and 13C).

The INJ B injection timing setting unit 526 calculates injection timing (valve opening time) of the injector 23B based on the injection amount input from the INJ B injection amount calculation unit 523, the comparison result input from the deviation comparison unit 524, and the interval input from the INJ B interval setting unit 525. The INJ B injection timing setting unit 526 outputs the injection timing thus calculated to the INJ B drive control unit 529.

In addition, when information meaning that anode pressure is less than or equal to the threshold value P1 is input from the pressure comparison unit 527, the INJ B injection timing setting unit 526 sets the valve opening time of the injector 23B anew (time t19 in FIG. 13C).

The pressure comparison unit 527 compares the anode pressure with the target pressure P0 and the threshold value P1 for every predetermined time period (e.g., 10 millisecond) and outputs the comparison result to the INJ A drive control unit 528 and the INJ B drive control unit 529. It should be noted that the threshold value P1 will be described later.

The INJ A drive control unit 528 controls the drive of the injector 23A according to the signal input from the INJ A injection amount calculation unit 522 and the pressure comparison unit 527. The INJ B drive control unit 529 controls the drive of the injector 23B according to the signal input from the INJ B injection amount calculation unit 523, the INJ B injection timing setting unit 526 and the pressure comparison unit 527.

<Operation of the Fuel Cell System>

Hereinafter, normal control, startup-time control and high power time control, which are carried out by the ECU 50, will be described in order of precedence. First, normal control will be described with reference to the flow charts in FIG. 10 to FIG. 12 and the time chart in FIGS. 13A to 13C. It should be noted that when carrying out normal control, the interval Int(A) of the injector 23A is made constant and the interval Int(B) of the injector 23B is adjusted according to changes in anode pressure.

<Normal Control>

At the interval starting time (START) of the injector 23A, in Step S301, the ECU 50 (adder subtracter 521) calculates the deviation ΔP of the anode pressure to the target pressure P0 (i.e., insufficient amount). In Step S302, the ECU (deviation comparison unit 524) determines whether or not the deviation ΔP calculated in Step S301 is greater than or equal to a threshold value $\Delta P_\alpha$. The above-described threshold value $P_\alpha$ is a value that serves as a criterion of whether or not the deviation ΔP can be decreased less than or equal to a predetermined value during the interval Int(A) when hydrogen is injected with the greatest ON duty only from the injector 23A. As shown in FIG. 13A, in the present embodiment, it is assumed as:

(threshold value $P_\alpha$)=(target pressure P0)−(predetermined value P1)

When the deviation ΔP is greater than or equal to the threshold value $P_\alpha$ (S302->Yes), the processing of the ECU 50 advances to Step S303. In this case, since the insufficient amount of anode pressure with respect to the target pressure P0 is large and high power is required, assistance by the injector 23B is surely needed (time t1 in FIG. 13A). In Step S303, the ECU 50 (INJ B interval setting unit 525) makes the interval Int(B1) of the injector 23B match with the interval Int(A) of the injector 23A (time t1 to t4 in FIG. 13B).

In Step S304, the ECU 50 (INJ A injection amount calculation unit 522) calculates the hydrogen amount that should be injected from the injector 23A. For example, the ECU 50 calculates the hydrogen amount corresponding to the upper limit value (e.g., 90%) of the Ti value of the injector 23A.

In Step S305, the ECU 50 (INJ B injection amount calculation unit 523) calculates the hydrogen amount that should be injected from the injector 23B. That is, the ECU 50 makes the deviation of the anode pressure with respect to the target pressure P0 small and calculates the injection amount of the injector 23B so as to supplement the insufficient amount of the injection amount of the injector 23A.

In Step S306, the ECU 50 (INJ B injection timing setting unit 526) sets the injection timing of the injector 23B such that at least a part of the valve opening time period of the injector 23B overlaps with the valve closing time period of the injector 23A. That is, the ECU 50 sets the valve opening time of the injector 23B (time t2 in FIG. 13C) such that the valve closing time of the injector 23B (time t4 in FIG. 13C) matches with the ending time of the interval of the injector 23A (Int(A) in FIG. 13B). By setting the injection timing of the injector 23B in this way, hydrogen of large flow rate can be supplied continuously.

Figure 11:
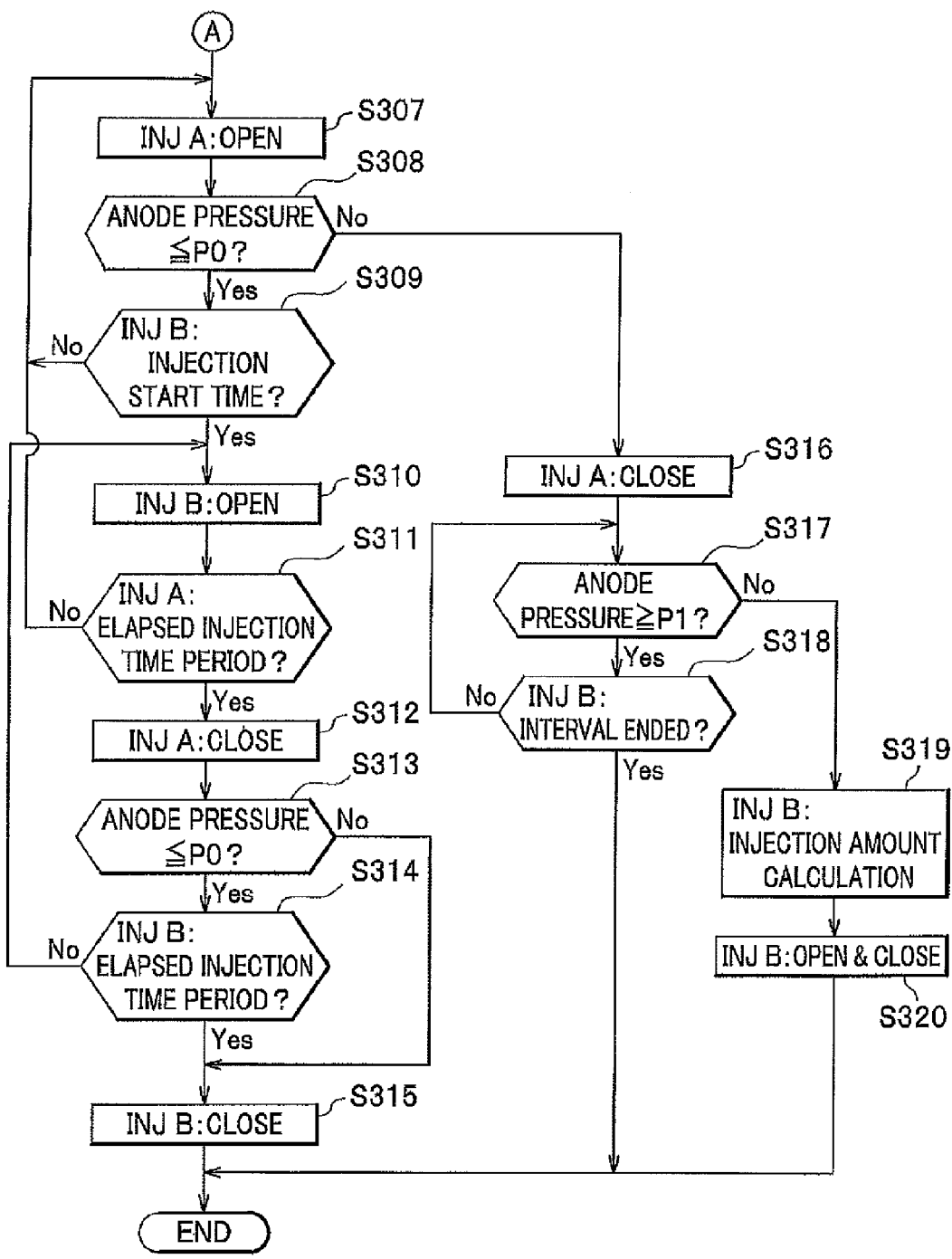
FIG. 11 is a flow chart showing the flow of operation of the ECU upon controlling each injector.

In Step S307 in FIG. 11, the ECU 50 (INJ A drive control unit 528) opens the valve of the injector 23A (time t1 in FIG. 13B). In Step S308, the ECU 50 (pressure comparison unit 527) determines whether or not the anode pressure is less than or equal to the target pressure P0. If the anode pressure is less than or equal to the target pressure P0 (S308->Yes), the ECU 50 (INJ B drive control unit 529) determines whether or not it has reached the injection starting time of the injector 23B in Step S309.

If it has not reached the injection starting time of the injector 23B (S309->No), the processing of the ECU 50 returns to Step S307. Meanwhile, if it has reached the injection starting time of the injector 23B (S309->Yes), the ECU 50 (INJ B drive control unit 529) opens the valve of the injector 23B in Step S310 (time t2 in FIG. 13C).

In Step S311, the ECU 50 determines whether or not the injection time period of the injector 23A has elapsed. It should be noted that the injection time period corresponds to the injection amount calculated by the INJ A injection amount calculation unit 522. If the injection time period of the injector 23A has not elapsed (S311->No), the processing of the ECU 50 returns to Step S307. Meanwhile, if the injection time period of the injector 23A has elapsed (S311->Yes), the ECU 50 (INJ A drive control unit 528) closes the valve of the injector 23A in Step S312 (time t3 in FIG. 13B).

In Step S313, the ECU 50 (pressure comparison unit 527) determines whether or not the anode pressure is less than or equal to the target pressure P0. If the anode pressure P is less than or equal to the target pressure P0 (S313->Yes), the ECU 50 (INJ B drive control unit 528) determines whether or not the injection time period of the injector 23B has elapsed in Step S314. If the injection time period of the injector 23B has not elapsed (S314->No), the processing of the ECU 50 returns to Step S310. Meanwhile, if the injection time period of the injector 23B has elapsed (S314->Yes), the ECU 50

(INJ B drive control unit 529) closes the valve of the injector 23B in Step S315 (time 4 in FIG. 13C).

In addition, if the anode pressure P is greater than the target pressure P0 in Step S308 (S308->Yes), the ECU 50 (INJ A drive control unit 528) closes the valve of the injector 23A in Step S316 (time t12, t18 in FIG. 13B). If the anode pressure is greater than the target pressure P0 as in this case, needless consumption of hydrogen can be suppressed by closing the valve of the injector 23A immediately.

In Step S317, the ECU 50 (pressure comparison unit 527) determines whether or not the anode pressure P is greater than or equal to the threshold value P1. The above-described threshold value P1 (refer to FIG. 13A) is a value that serves as a criterion of whether or not it is necessary to increase the anode pressure by opening the valve of the injector 23B. If the anode pressure is greater than or equal to the threshold value P1 (S317->Yes), the ECU 50 determines whether or not the interval of the injector 23B at this time has ended in Step S318.

If the interval of the injector 23B has not ended (S318->No), the processing of the ECU 50 returns to Step S317. Meanwhile, if the interval of the injector 23B has ended (S318->Yes), the processing of the ECU 50 advances to the next interval (END).

In addition, if the anode pressure is less than the threshold value P1 in Step S317 (S317->No), the ECU 50 (INJ B injection amount calculation unit 523) calculates the injection amount of the injector 23B in Step S319. For example, according to the anode pressure at the time of processing in Step S319, the ECU 50 calculates the injection amount of the injector 23B such that the anode pressure approaches to the target pressure P0.

In Step S320, the ECU 50 (INJ B drive control unit 529) opens and closes the injector 23B (time t19, t20 in FIG. 13C). As described above, it is possible to increase the anode pressure by opening the valve of the injector 23B even when the anode pressure decreases suddenly with the valve closing of the injector 23A (S317->No).

Figure 10:
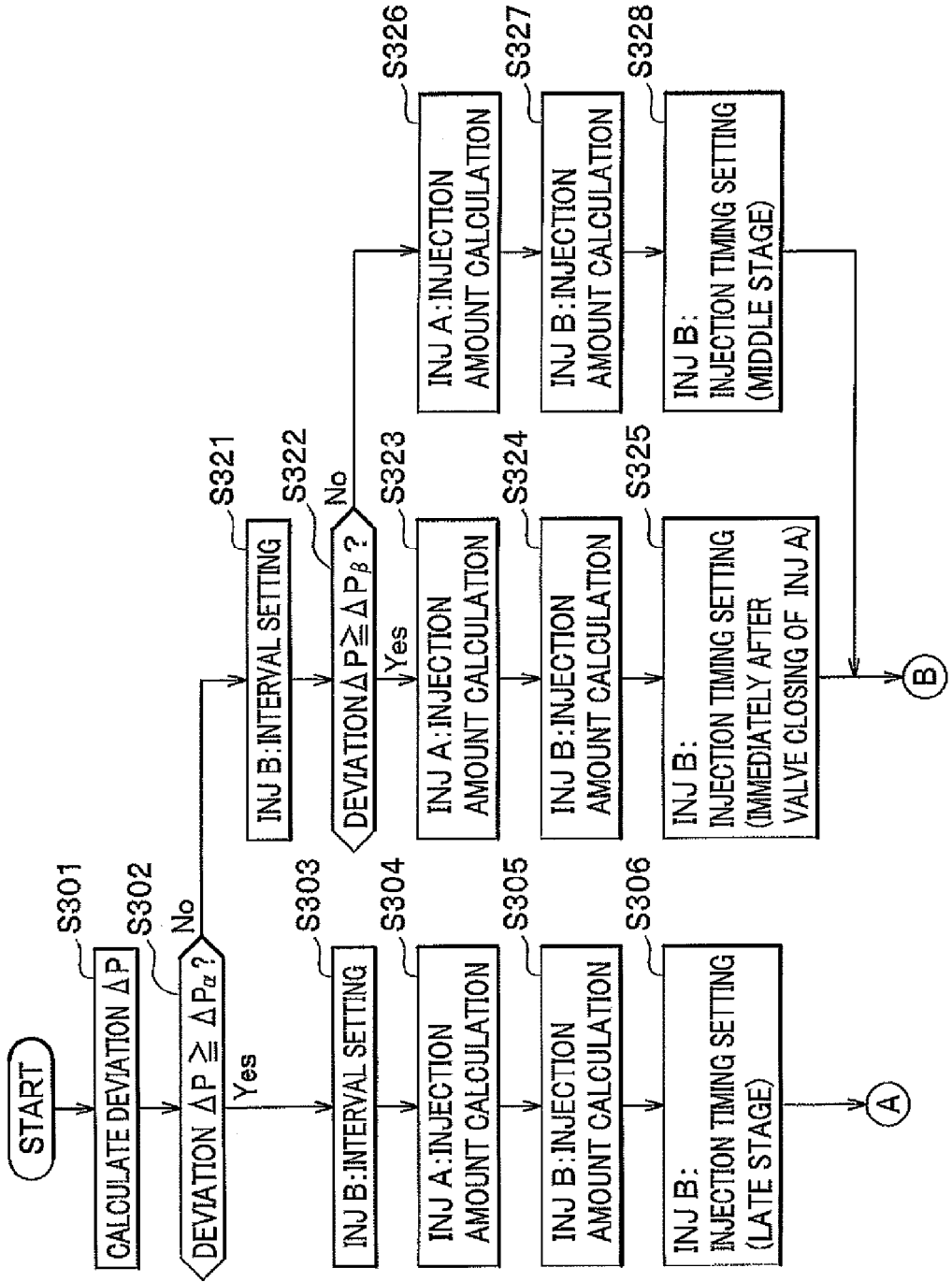
FIG. 10 is a flow chart showing the flow of operation of the ECU upon controlling each injector.

If the deviation ΔP is not greater than or equal to the threshold value $P_\alpha$ in Step S302 in FIG. 10 (S302->No), the processing of the ECU 50 advances to Step S321. In this case, the insufficient amount of anode pressure with respect to the target pressure P0 is relatively small and low power is required. In Step S321, the ECU 50 (INJ B interval setting unit 525) makes the interval Int(B2) of the injector 23B the valve closing time of the injector 23A (e.g., time t5 to t7 in FIG. 13B).

In Step S322, the ECU 50 (deviation comparison unit 524) determines whether or not the deviation ΔP is greater than or equal to a threshold value $P_\beta$. The threshold value $P_\beta$ shown in FIG. 13A is a threshold value that serves as a criterion at the time of setting the injection timing of the injector 23B (whether it is immediately after the valve closing of the injector 23A and whether it is in the middle stage of the valve closing time) in order to suppress the valve closing continuation time period of the injector 23B less than or equal to the predetermined value.

If the deviation ΔP is greater than or equal to the threshold value $P_\beta$ (S322->Yes), the ECU 50 calculates the injection amount of the injectors 23A and 23B sequentially in Step S323 and S324. In Step S325, the ECU 50 sets the valve opening time of the injector 23B to the valve closing time of the injector 23A (time t5, t15 in FIGS. 13B and 13C). Thereby, it is possible to continuously supply hydrogen by the injectors 23A and 23B.

It should be noted that it is preferable that the ECU 50 make the valve opening time period of the injector 23B (e.g., time t15 to t16 in FIG. 13C) include time near the center of the valve closing time period of the injector 23A (time t15 to t17 in FIG. 13B). Thereby, hydrogen supplied to the fuel cell 11 can be brought close to a continuous flow.

If the deviation ΔP is less than the threshold value $P_\beta$ in Step S322 (S322->No), the ECU 50 calculates the injection amount of the injectors 23A and 23B sequentially in Steps S326 and S327. In Step S328, the ECU 50 sets the injection starting time of the injector 23B to time in the middle stage of the valve closing time period of the injector 23A (time t9 in FIG. 13B). That is, the valve opening time of the injector 23B is set such that the continuous time period when the valves of the injectors 23A and 23B are all closed (e.g., time (t8 to t9): refer to FIGS. 13B and 13C) does not become greater than or equal to the predetermined time period. The above-described predetermined time period is set as appropriate such that there will be no deficiencies in stoichiometry in the fuel cell 11.

Figure 12:
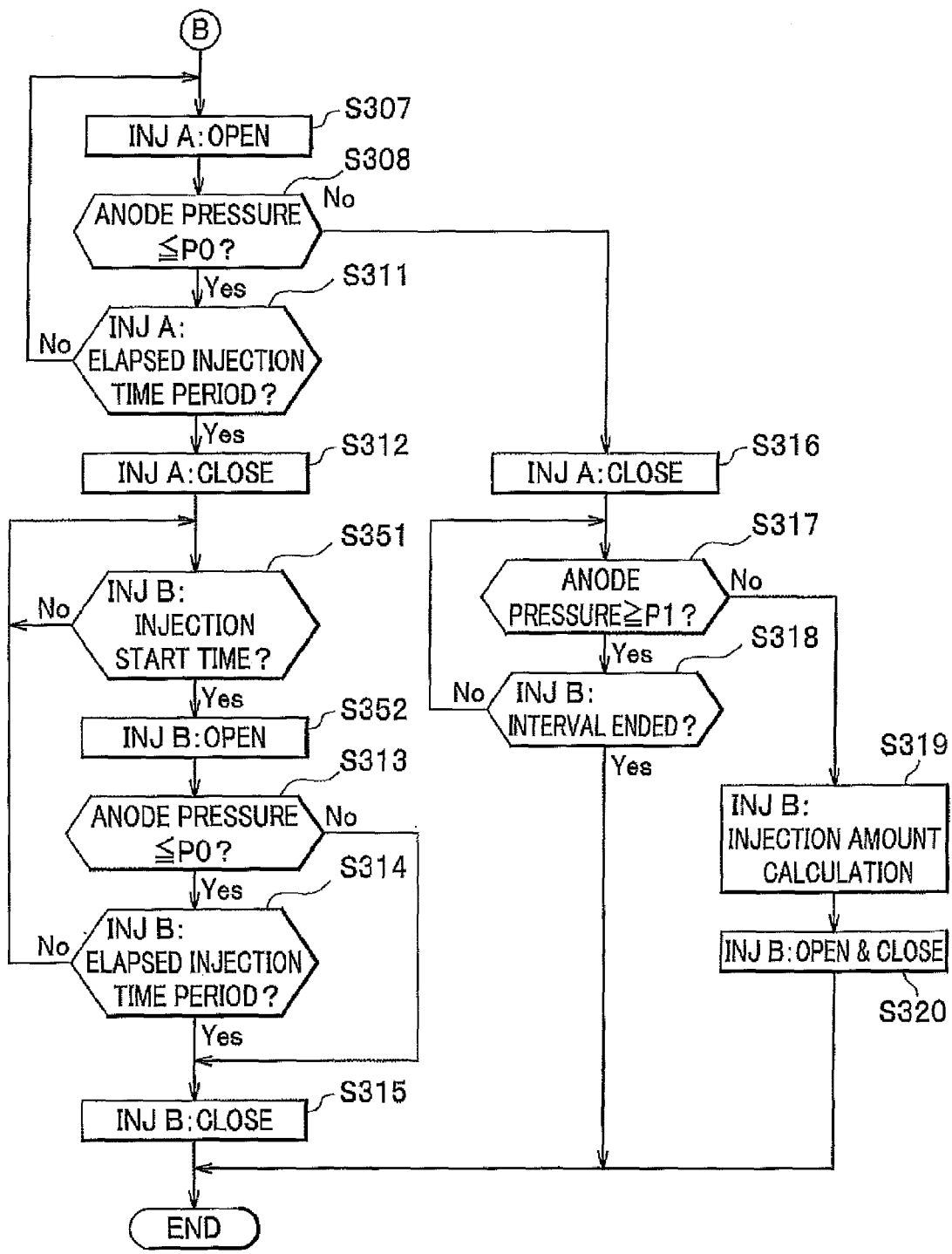
FIG. 12 is a flow chart showing the flow of operation of the ECU upon controlling each injector.
Figure 13:
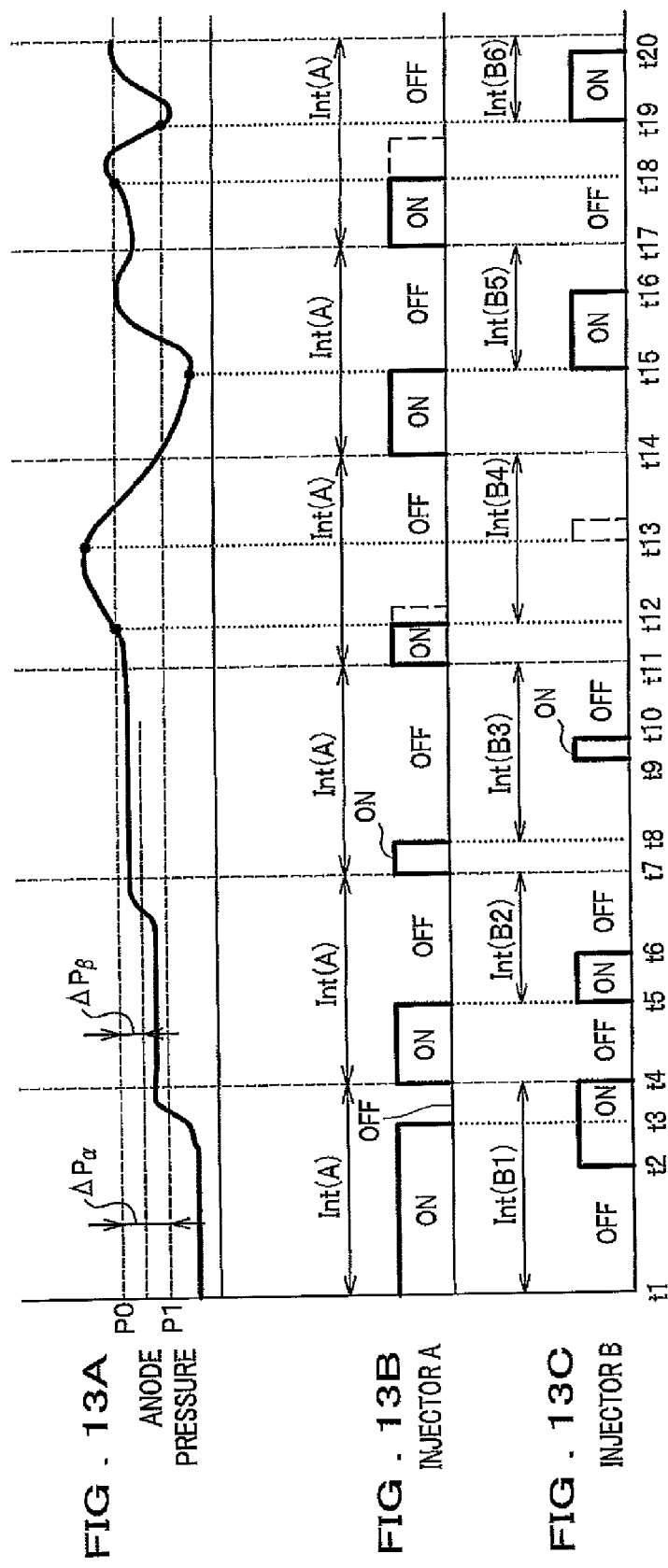
FIG. 13A is a time chart showing temporal changes in anode pressure.
FIG. 13B is a time chart showing temporal changes in ON/OFF of the injector A.
FIG. 13C is a time chart showing temporal changes in ON/OFF of the injector B.

After setting the injection timing of the injector 23B (S325, S328), the processing of the ECU 50 advances to Step S307 in FIG. 12. The processing shown in FIG. 12 is different from the processing in FIG. 11 in that the valve of the injector 23B is opened (S352) when it has become the injection starting time of the injector 23B after the ECU 50 closed the valve of the injector 23A (S312) (S351->Yes). It should be noted that other processing is the same as that in FIG. 11 (step numbers in FIG. 12 correspond to that in FIG. 11). Therefore, detailed descriptions are omitted for the flow chart shown in FIG. 12.

<Startup Time Control>

Figure 14:
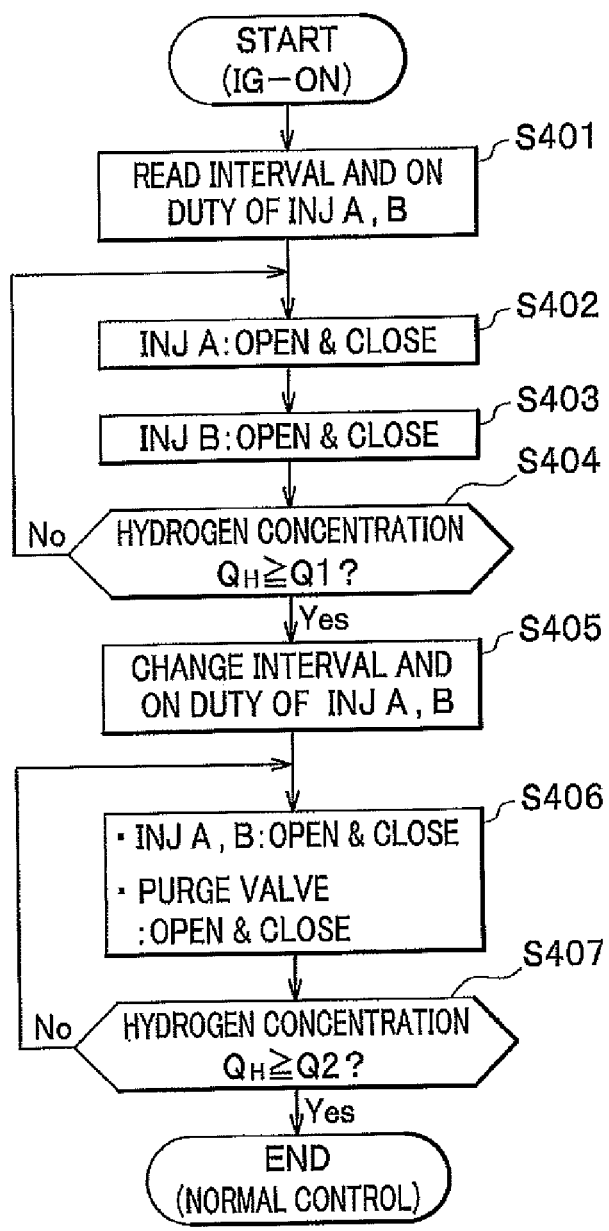
FIG. 14 is a flow chart showing the flow of operation of the ECU upon controlling each injector in startup-time control.
Figure 15:
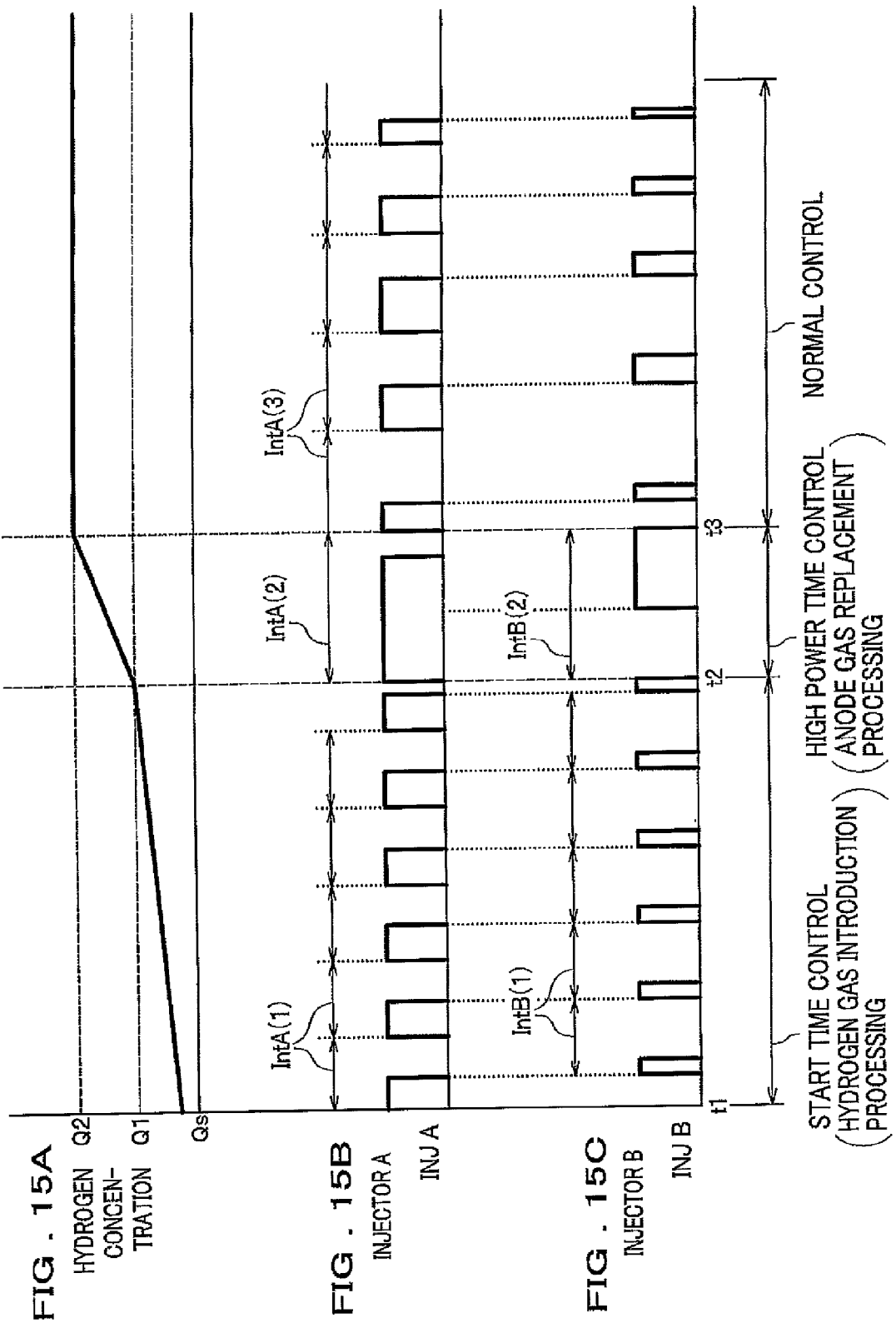
FIGS. 15A to 15C are time charts relating to startup-time control.

Next, the control at the system startup time will be described with reference to the flow chart in FIG. 14 and the time chart in FIGS. 15A to 15C. It should be noted that startup-time control includes: hydrogen gas introduction processing which introduces hydrogen gas into the anode fluidic channel 11a; and anode gas replacement processing which replaces the gas in the anode fluidic channel 11a with hydrogen (refer to FIG. 15A).

The ECU 50 starts the startup-time control when an ON signal is input from the start switch (IG) (START). In Step S401, the ECU 50 reads the interval and the ON duty of the injectors 23A and 23B. In the present embodiment, intervals of the injectors 23A and 23B at the system startup time are fixed values and each ON duty is also a fixed value (time t1 to t2 in FIGS. 15A to 15C).

In Step S402, the ECU 50 (INJ A drive control unit 528) opens and closes the injector 23A based on the interval and the ON duty read in Step S401. Similarly, in Step S403, the ECU 50 (INJ B drive control unit 529) opens and closes the injector 23B. Here, the ECU 50 (INJ B injection timing setting unit 526) sets the valve opening time of the injector 23B to the valve closing time of the injector 23A. Thereby, hydrogen that flows through the anode fluidic channel 11a as a result of the injection of the two injectors 23A and 23B can be brought close to a continuous flow.

It should be noted that only at least one part of the valve opening time period of the injector 23B is needed to overlap with the valve closing time period of the injector 23A, and the injection timing of the injector 23B is not limited to the example shown in FIGS. 15B and 15C. As a result of the processing in Step S402 and S403, hydrogen concentration in the anode fluidic channel 11a (piping a4) increases with the passage of time (time t1 to t2 in FIGS. 15A to 15C).

In Step S404, the ECU 50 determines whether or not hydrogen concentration QH, which is detected with a concentration sensor (not illustrated) installed in the piping a4, is greater than or equal to a predetermined value Q1. The predetermined value Q1 is a threshold value that serves as a criterion of whether or not to start the anode gas replacement processing, which replaces gas in the anode fluidic channel 11a (refer to FIG. 1). If the hydrogen concentration QH is less than the predetermined value Q1 (S404->No), the processing of the ECU 50 returns to Step S402. Meanwhile, if the hydrogen concentration QH is greater than or equal to the predetermined value Q1 (S404->Yes), the processing of the ECU 50 advances to Step S405.

In Step S405, the ECU 50 changes the interval and the ON duty of the injectors 23A and 23B in order to perform anode gas replacement. That is, as shown in FIGS. 15B and 15C, an interval Int(A2) longer than the case of hydrogen gas introduction processing is set.

In Step S406, the ECU 50 (INJ A drive control unit 528 and INJ B drive control unit 529) opens and closes the injectors 23A and 23B. It should be noted that the ECU 50 (INJ B injection timing setting unit 526) sets the valve opening time of the injector 23B to the valve closing time of the injector 23A. Thereby, hydrogen of large flow rate can be continuously supplied towards the anode fluidic channel 11a. In addition, the ECU 50 opens the valve of the purge valve 25 (refer to FIG. 1) in time t2 to t3 in FIGS. 15A to 15C. Thereby, gas accumulated in the piping a4, the anode fluidic channel 11a, the piping a5 and a6 (refer to FIG. 1) flows into the diluter 32 via the piping a7 and a8 and is discharged to outside of the vehicle.

In Step S407, the ECU 50 determines whether or not the hydrogen concentration QH is greater than or equal to a predetermined value Q2. The above-described predetermined value Q2 is a threshold value that serves as a criterion of whether or not to switch to normal control after replacing the anode gas with hydrogen at the system startup time. If the hydrogen concentration QH is less than the predetermined value Q2 (S407->No), the processing of the ECU 50 returns to Step S407. Meanwhile, if the hydrogen concentration QH is greater than or equal to the predetermined value Q2 (S407->Yes), the ECU 50 ends the startup-time control (END) and advances to normal control.

<High Power Time Control: INJ A>

Figure 16:
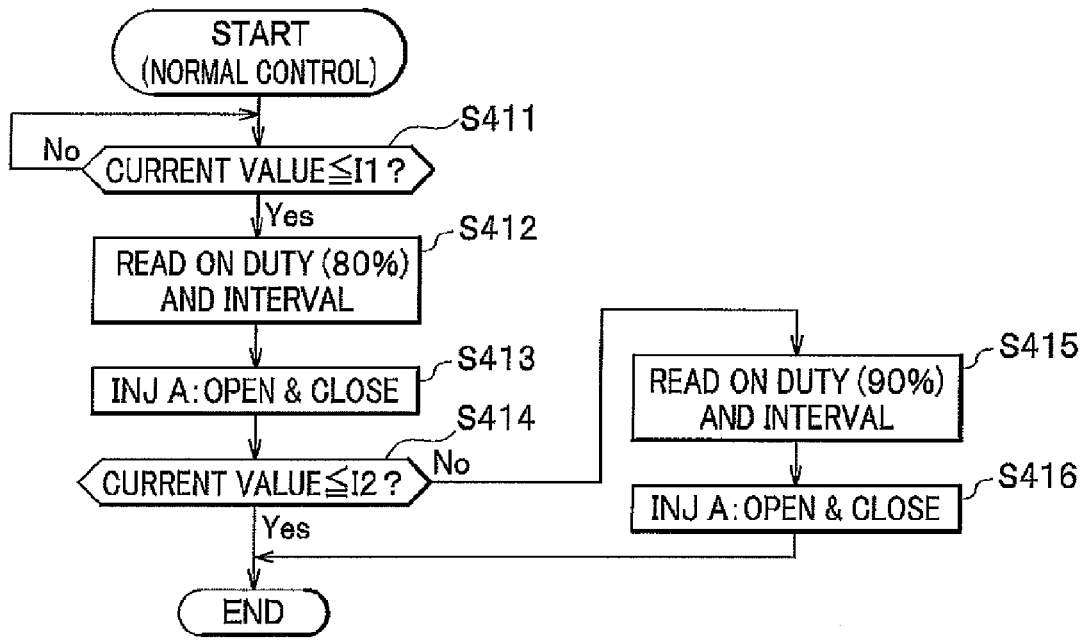
FIG. 16 is a flow chart showing the flow of operation of the ECU upon controlling one of the injectors in high power time control.

Next, processing for driving the injector 23A with high power time control will be described with reference to the flow chart in FIG. 16 and the time chart in FIGS. 18A to 18D. In Step S411 in FIG. 16, the ECU 50 determines whether or not the detection value of a current detector (not illustrated) connected to a VCU 41 is greater than or equal to a predetermined value I1. The predetermined value I1 is a threshold value that serves as a criterion of whether or not to switch from the above-described normal control to high power time control. If the current value is less than the predetermined value I1 (S411->No), the ECU 50 repeats processing of Step S411 while continuing normal control. Meanwhile, if the current value is greater than or equal to the predetermined value I1 (S411->No), the processing of the ECU 50 advances to Step S412.

In Step S412, the ECU 50 reads the interval and the ON duty (e.g., 80%) of the injector 23A. In Step S413, the ECU 50 (INJ A drive control unit 528) opens and closes the injector 23A with the interval and the ON duty set in Step S412. In Step S414, the ECU 50 determines whether or not the current value is less than or equal to a predetermined value I2. The above-described predetermined value I2 is a threshold value that serves as a criterion of whether or not to increase the ON duty of the injector 23A furthermore.

If the current value is less than the predetermined value I2 (S414->Yes), the ECU 50 ends the processing (END—advances to the next interval). Meanwhile, if the current value is greater than the predetermined value I2 (S414->No), the ECU 50 reads again the interval and the ON duty of the injector 23A in Step S415. It should be noted that the interval of the injector 23A is not changed but the ON duty is increased from 80% (S412) to 90% (S413) in the present embodiment.

In Step S416, the ECU 50 (INJ A drive control unit 537) and opens and closes the injector 23A with the ON duty and the interval read in Step S415. That is, when the current value taken out from the fuel cell 11 is large (S414->Yes), the ECU 50 drives the injector 23A with a relatively high ON duty (S415, S416). Thereby, hydrogen of large flow rate is supplied towards the anode fluidic channel 11a of the fuel cell 11 and it is possible to maintain a high power state.

<High Power Time Control: INJ B>

Figure 17:
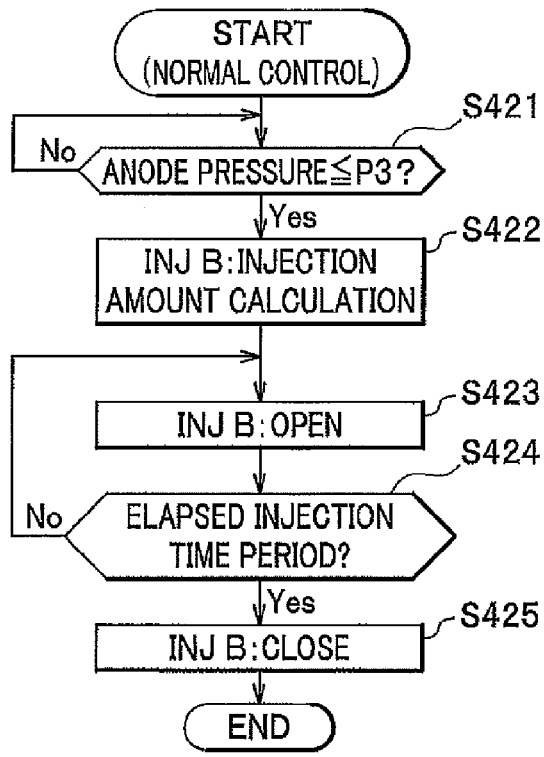
FIG. 17 is a flow chart showing the flow of operation of the ECU upon controlling the other one of the injectors in high power time control.
Figure 18:
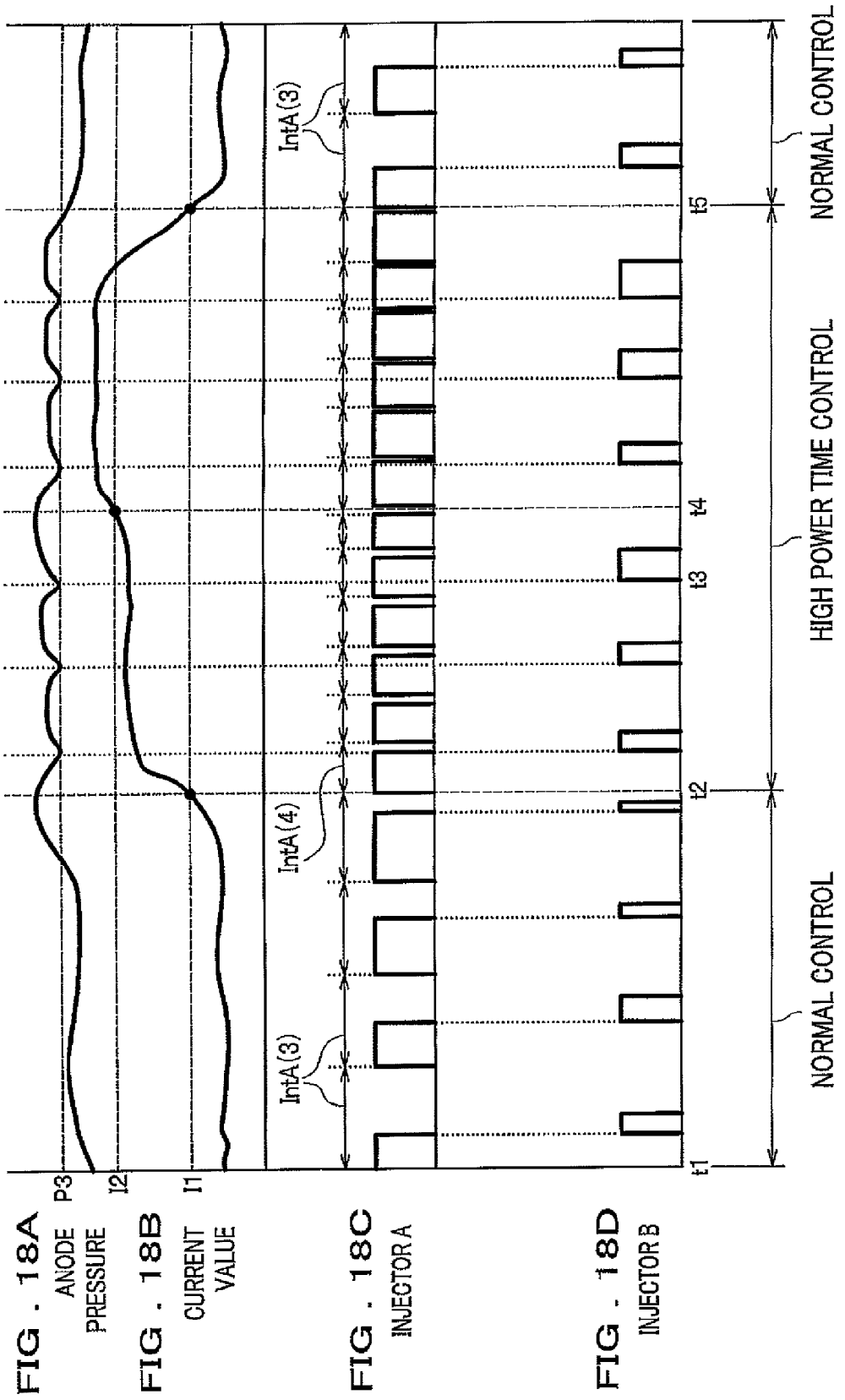
FIGS. 18A to 18D are time charts related to high power time control.

Next, processing for driving the injector 23B with high power time control will be described with reference to the flowchart in FIG. 17 and the time chart in FIGS. 18A to 18D. In Step S421 in FIG. 17, the ECU 50 (pressure comparison unit 527) determines whether or not the anode pressure is less than or equal to a threshold value P3. The above-described threshold value P3 (refer to FIG. 18A) is a threshold value that serves as a criterion of whether or not to open the valve of the injector 23B to supplement hydrogen corresponding to the insufficient amount with only the injector 23A.

If the anode pressure is greater than the threshold value P3 (S421->No), the ECU 50 repeats the processing of Step S421. Meanwhile, if the anode pressure is less than or equal to the threshold value P3 (S421->Yes), the processing of the ECU 50 advances to Step S422. In Step S422, the ECU 50 (INJ B injection amount calculation unit 523) calculates the injection amount of the injector 23B (i.e., ON duty) based on, for example, PID (Proportional Integral Derivative) control.

In Step S423, the ECU 50 (INJ B drive control unit 529) opens the valve of the injector 23B with an ON duty corresponding to the injection amount calculated in Step S422. In Step S424, the ECU 50 determines whether or not the injection time period has elapsed. If the injection time period (S424->No) has not elapsed, the processing of the ECU 50 returns to Step S423. Meanwhile, if the injection time period has elapsed (S424->Yes), the ECU 50 (INJ B drive control unit 538) closes the valve of the injector 23B and ends the processing (END: changes to normal control).

<Advantageous Effects>

In the present embodiment, the valve opening time and valve closing time of the injector 23B are set as appropriate according to the deviation ΔP of the anode pressure with respect to the target pressure P0 (S302, S322, S326). Thereby, it is possible to carryout fine feedback control and thus to control each injector 23A and 23B so as to negate the deviation ΔP with respect to the target pressure P0.

In addition, the present embodiment performs processing for monitoring by the ECU 50 whether or not the anode pressure is greater than the target pressure P0 while the valve of at least one of the injectors 23A and 23B is opened (S308, S313). If the anode pressure is greater than the target pressure P0 (S308->No, S313->No), needless consumption of hydrogen can be reduced by once stopping hydrogen supply carried out by each injector 23A and 23B (S315, S316). In addition, if the anode pressure is decreased to be less than the predetermined pressure P1 while valves of both the injectors 23A and 23B are closed (S317->No), deficiencies in stoichiometry can be surely avoided by injecting hydrogen from the injector 23B immediately (S320).

In addition, negative pressure is generated in the circumference of the nozzle 24p included in the ejector 24 (refer to FIG. 1) by injecting hydrogen from the injector 23A and thus off gas can be circulated in the circulated fluidic channel including the piping a4, the anode fluidic channel 11a, and the piping a5 and a6. That is, by returning hydrogen that has not reacted yet to the anode fluidic channel 11a, it is possible to consume hydrogen with efficiently. Meanwhile, by injecting hydrogen from the injector 23B, hydrogen of high concentration is directly supplied to the anode fluidic channel 11a via the piping b2 and a4 and the hydrogen pressure in the anode fluidic channel 11a changes with rapid response. Therefore, it is possible to maintain pressure and hydrogen concentration in the anode fluidic channel 11a within an appropriate range by adjusting the injection amount and injection timing of the injector 23B.

In addition, sequence control is performed in the startup of the fuel cell system by fixing the interval and the ON duty of each injector 23A and 23B. When performing such sequence control, hydrogen directed to the anode fluidic channel 11a can be brought close to a continuous flow by opening the valve of the injector 23B in the valve closing time period of the injector 23A (S402, S403). Therefore, hydrogen concentration in the anode fluidic channel 11a can be increased promptly.

In addition, in the present embodiment, when performing high power time control, the ON duty of the injector 23A is fixed (S412, S415) and the amount insufficient with only the injector 23B is supplemented with the injector 23A (S421->Yes, S423). That is, by supplying hydrogen of large flow rate from the injector 23A and by assisting hydrogen supply by the injector 23B, hydrogen of an appropriate flow rate is supplied towards the anode fluidic channel 11a and high power state can be maintained.

<<Modification Example>>

Figure 19:
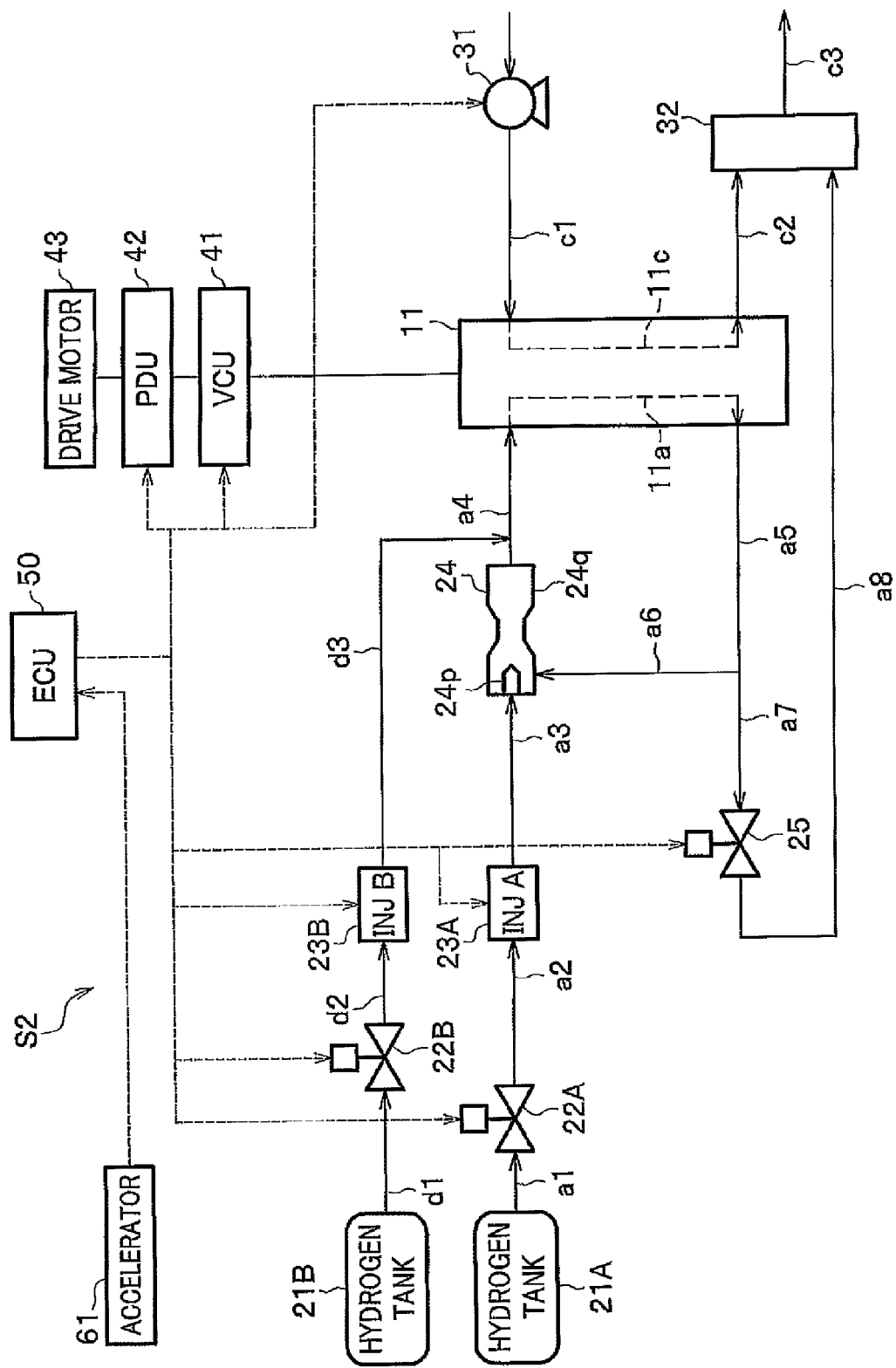
FIG. 19 is an overall structural view of the fuel cell system according to a modification example of the present invention.

As described above, although each of the above-described embodiments has been described for the fuel cell system S1 according to the present invention, the embodiment of the present invention is not limited to these statements and can make various changes. FIG. 19 is an overall structural view of the fuel cell system according to the modification example of the present invention. The fuel cell system S2 shown in FIG. 19 includes two hydrogen tanks 21A and 21B. Like the first embodiment, the upstream side is connected to the hydrogen tank 21A via the piping a2, the cutoff valve 22A and the piping a1, and, the injector 23A (first fuel gas injection device), the downstream side is connected to the ejector 24 via the piping a3. Meanwhile, the injector 23B (first fuel gas injection device), the upstream side is connected to the hydrogen tank 21B via the piping d2, the cutoff valve 22B and the piping d1 and the downstream side is connected to the piping a4 via the piping d3.

In this case, "first fuel gas supply fluidic channel" in which the injector 23A is provided is configured to include the piping a1, a2, a3 and a4. In addition, "second fuel gas supply fluidic channel" in which the injector 23B is provided is configured to include the piping d1, d2 and d3. It should be noted that since other structure and the control method of the injectors 23A and 23B are the same as that of the first embodiment, the descriptions are omitted. The structure shown in FIG. 19 has the same functions and advantageous effects as the cases described with respect to the first embodiment.

In addition, although an example that uses three threshold values (Q1, Q2, and Q3) when setting the injection amount and the injection timing by the injector 23B (and 23C) is shown in each of the above-described embodiments, the present invention is not limited to this. That is, the threshold value to be used may be two or less and may be four or more. In addition, the first embodiment has been described for cases where the fuel gas requirement amount at the valve closing time of the injector 23A is greater than or equal to a threshold value Q1 (S115->Yes—refer to FIG. 4), is greater than or equal to the threshold value Q2 and less than Q1 (S119->Yes—refer to FIG. 4), and cases where the valve of the injector 23B is opened in the late stage of the interval. However, the present invention is not limited to these. That is, the timing to open the injector 23B may be changed as appropriate. For example, the injector 23B may be opened in the early stage or the middle stage of the interval.

In addition, the first embodiment has been described for cases where the fuel gas requirement amount at the interval starting time of the injector 23A is greater than or equal to the threshold value Q1 (S103->Yes—refer to FIG. 3), and cases where the interval of the injector 23B is on the same sectional period as the interval of the injector 23A (S104—refer to FIG. 3). However, the present invention is not limited to these. That is, the interval of the injector 23B may be set as appropriate such that the valve opening of the injector 23B is ended at the interval ending time of the injector 23A and the above-described fuel gas requirement amount is met. In addition, for example, the injection timing of the injector 23B may be set so as to open the valve in the middle stage of the interval Int(B) regardless of largeness or smallness of the fuel gas requirement amount.

In addition, although the second embodiment has been described for the case where the injection amount and the injection timing of the injectors 23B and 23C are set at the valve closing time of the injector 23A, the present invention is not limited to this. That is, the injection amount and the injection timing of the injector 23B may be set at the valve closing time of the injector 23A, and furthermore the injection amount and the injection timing of the injector 23C may be set at the valve closing time of the injector 23B. This enables to perform hydrogen supply more finely.

In addition, although the second embodiment has been described for the case where the starting time and ending time of the interval of the injectors 23B and 23C are set to the same time with each other, the present invention is not limited to this. For example, it may be configured such that the valve closing time of the injector 23A is equally divided into two, and the first half is set as the interval of the injector 23B and the second half is set as the interval of the injector 23C. In this case, the injection amount and the injection timing of the injector 23C may be set to the valve closing time of the injector 23A and may be set to the valve closing time of the injector 23B. In addition, although the second embodiment has been described for the case where the bore diameter of the nozzle of the injector 23B is larger than the bore diameter of the nozzle of the injector 23C, the present invention is not limited to this. That is, the injectors 23B and 23C may have nozzles having the same bore diameter.

In addition, although each of the above-described embodiments has been described for cases where the ECU 50 calculates the fuel gas requirement amount based on, for example, the target generating current of the fuel cell 11, the target pressure of the anode fluidic channel 11a, and the purge amount upon the valve opening of the purge valve 25, the present invention is not limited to this. For example, the fuel gas requirement amount may be calculated by taking into consideration the cell voltage and the temperature of the fuel cell 11, for example. In addition, the fuel gas requirement amount may be calculated according to the accelerator level of the fuel cell vehicle that includes the fuel cell systems S1 and S2. In addition, although each of the above-described embodiments has been described for the case where hydrogen is used as the fuel gas, natural gas or the like may be used as the fuel gas.

In addition, although cases where the intervals of the injectors 23A and 23B are variable have been described in the above embodiments, the present invention is not limited to this. That is, the intervals of the injectors 23A and 23B maybe fixed values.

In addition, although a case where high power is required (S103->Yes) and a case where the interval of the injectors 23A and 23B is set in the same time period section have been described in the first embodiment (S104), the present invention is not limited to these. That is, the intervals of the injectors 23A and 23B may be set to the same time period section regardless of the magnitude of the required power.

In addition, a case where low power is required (S103->No) and a case where the injection amount of the injector 23B is set according to the fuel gas requirement amount at the time of ending the valve opening of the injector 23A have been described in the first embodiment (S116), the present invention is not limited to these. That is, the injection amount of the injector 23B may be set according to the fuel gas requirement amount at the time of ending the valve opening of the injector 23A regardless of the magnitude of the required power.

DESCRIPTION OF REFERENCE NUMERALS

S1, S2: fuel cell system
11: fuel cell
11a: anode fluidic channel (fuel gas fluidic channel)
11c: cathode fluidic channel (oxidant gas fluidic channel)
21, 21A, 21B: hydrogen tank
23A: injector (first fuel gas injection device)
23B: injector (second fuel gas injection device)
24: ejector
25: purge valve
50: ECU (controller)
501: fuel gas requirement amount calculation unit (fuel gas requirement amount calculation means)
502: INJ A interval setting unit (interval setting means)
503: first comparison unit
504: INJ A injection amount calculation unit (first valve opening time period calculation means)
505, 514: INJ B injection amount calculation unit (second valve opening time period calculation means)
506, 515: INJ B injection timing setting unit (injection starting time setting means)
507: INJ B interval setting unit (interval setting means)
508: INJ B injection amount fixing time setting unit
509: fuel gas requirement amount integration unit (fuel gas requirement amount calculation means)
510: INJ A actual injection amount integration unit
511: adder subtracter
512: adder
513: second comparison unit
61: accelerator
a1, a2, a3, a4: piping (first fuel gas supply fluidic channel)
a1, a2, b1, b2, d1, d2, d3: piping (second fuel gas supply fluidic channel)
a5, a7, a8: piping (fuel off gas discharge fluidic channel)
a6: piping (return fluidic channel)

What is claimed is:

1. A fuel cell system comprising:
a fuel cell which generates electricity by fuel gas being supplied to a fuel gas fluidic channel and oxidant gas being supplied to an oxidant gas fluidic channel;
a first fuel gas supply fluidic channel through which fuel gas directed to the fuel gas fluidic channel flows;
a fuel off gas discharge fluidic channel through which fuel off gas discharged from the fuel gas fluidic channel flows;
a return fluidic channel through which fuel off gas returning from the fuel off gas discharge fluidic channel to the first fuel gas supply fluidic channel flows;
a first fuel gas injection device which is provided in the first fuel gas supply fluidic channel and injects fuel gas by opening and closing a valve;
an ejector which is provided in the first fuel gas supply fluidic channel downstream of the first fuel gas injection device and mixes fuel off gas returning from the fuel off gas discharge fluidic channel to the first fuel gas supply fluidic channel via the return fluidic channel with fuel gas to be injected by the first fuel gas injection device;
a second fuel gas supply fluidic channel through which fuel gas directed to the fuel gas fluidic channel flows and a downstream end of the second fuel gas supply fluidic channel is connected to the first fuel gas supply fluidic channel downstream of the ejector;
a second fuel gas injection device which is provided in the second fuel gas supply fluidic channel and injects fuel gas by opening and closing a valve; and
a control means that is configured to control the first fuel gas injection device and the second fuel gas injection device, wherein
the control means is configured to adjust a flow rate of the fuel gas injected from the first fuel gas injection device by adjusting a valve opening time period and a valve closing time period of the first fuel gas injection device, which are repeated alternately, and
the control means is configured to make at least a part of the valve opening time period of the second fuel gas injection device overlap with the valve closing time period of the first fuel gas injection device when opening the valve of the second fuel gas injection device.

2. The fuel cell system according to claim 1, wherein the control means is configured to make a continuous time period in which valves of both the first fuel gas injection device and the second fuel gas injection device are closed not become greater than or equal to a predetermined time period when opening the valve of the second fuel gas injection device.

3. The fuel cell system according to claim 1, wherein the control means is configured to make the valve opening time period of the second fuel gas injection device include time near a center of the valve closing time period of the first fuel gas injection device when opening the valve of the second fuel gas injection device.

4. The fuel cell system according to claim 2, wherein the control means is configured to make the valve opening time period of the second fuel gas injection device include time near a center of the valve closing time period of the first fuel gas injection device when opening the valve of the second fuel gas injection device.

5. The fuel cell system according to claim 1, wherein the control means comprises:
- an interval setting means that is configured to set a first interval which consists of an opening time period and a closing time period of the first fuel gas injection device and a second interval which consists of an opening time period and a closing time period of the second fuel gas injection device;
- a first valve opening time period calculation means that is configured to calculate the valve opening time period of the first fuel gas injection device during the first interval;
- a second valve opening time period calculation means that is configured to calculate the valve opening time period of the second fuel gas injection device during the second interval; and
- an injection starting time setting means that is configured to set injection starting time of the second fuel gas injection device such that the second fuel gas injection device is in a valve open state during at least a valve closing time period of the first fuel gas injection device when high power is required at a time of starting valve opening of the first fuel gas injection device.

6. The fuel cell system according to claim 5, wherein
the control means further comprises a fuel gas requirement amount calculation means that is configured to calculate a fuel gas requirement amount required for generating electricity in the fuel cell;
the interval setting means is configured to set the first interval and the second interval according to the fuel gas requirement amount calculated by the fuel gas requirement amount calculation means;
the first valve opening time period calculation means is configured to calculate a valve opening time period of the first fuel gas injection device during the first interval according to the fuel gas requirement amount calculated by the fuel gas requirement amount calculation means; and
the second valve opening time period calculation means is configured to calculate a valve opening time period of the second fuel gas injection device during the second interval according to the fuel gas requirement amount calculated by the fuel gas requirement amount calculation means.

7. The fuel cell system according to claim 6, wherein
the injection starting time setting means is configured to set injection starting time of the second fuel gas injection device such that valve open ending time of the second fuel gas injection device matches with ending time of the first interval according to the fuel gas requirement amount calculated by the fuel gas requirement amount calculation means.

8. The fuel cell system according to claim 6, wherein
the interval setting means is configured to set a valve closing time period of the first fuel gas injection device during the first interval as the second interval according to the fuel gas requirement amount calculated by the fuel gas requirement amount calculation means; and
the second valve opening time period calculation means is configured to calculate a valve opening time period of the second fuel gas injection device during the second interval at a time of ending valve opening of the first fuel gas injection device.

9. The fuel cell system according to claim 6, wherein
the second valve opening time period calculation means is configured to set a valve opening time period of the second fuel gas injection device during the second interval to zero according to the fuel gas requirement amount calculated by the fuel gas requirement amount calculation means.

10. The fuel cell system according to claim 6, wherein
the injection starting time setting means is configured to set injection starting time of the second fuel gas injection device according to the fuel gas requirement amount at a time of ending valve opening of the first fuel gas injection device.

11. The fuel cell system according to claim 5, wherein
the interval setting means is configured to set the second interval to a same time period section as the first interval.

12. The fuel cell system according to claim 6, wherein
the interval setting means is configured to set the second interval to a same time period section as the first interval.

13. The fuel cell system according to claim 5, wherein
the injection starting time setting means is configured to set the injection starting time of the second fuel gas injection device such that a valve closing continuation time period of the second fuel gas injection device during the second interval does not become greater than or equal to a predetermined time period.

14. The fuel cell system according to claim 6, wherein
the injection starting time setting means is configured to set the injection starting time of the second fuel gas injection device such that a valve closing continuation time period of the second fuel gas injection device during the second interval does not become greater than or equal to a predetermined time period.

15. The fuel cell system according to claim 6, wherein
the fuel gas requirement amount calculation means is configured to calculate the fuel gas requirement amount according to an accelerator level of a fuel cell vehicle that has the fuel cell system therein.

* * * * *